US009532389B2

(12) United States Patent
Morioka

(10) Patent No.: US 9,532,389 B2
(45) Date of Patent: Dec. 27, 2016

(54) RADIO BASE STATION AND RADIO COMMUNICATION SYSTEM

(71) Applicant: NTT DOCOMO, INC., Tokyo (JP)

(72) Inventor: Yasufumi Morioka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/405,228

(22) PCT Filed: May 28, 2013

(86) PCT No.: PCT/JP2013/064773
§ 371 (c)(1),
(2) Date: Dec. 3, 2014

(87) PCT Pub. No.: WO2013/183493
PCT Pub. Date: Dec. 12, 2013

(65) Prior Publication Data
US 2015/0119054 A1 Apr. 30, 2015

(30) Foreign Application Priority Data
Jun. 6, 2012 (JP) .................................. 2012-128882

(51) Int. Cl.
*H04W 72/04* (2009.01)
*H04W 76/02* (2009.01)
(Continued)

(52) U.S. Cl.
CPC ............. *H04W 76/02* (2013.01); *H04W 48/10* (2013.01); *H04W 16/32* (2013.01); *H04W 92/20* (2013.01)

(58) Field of Classification Search
CPC .................................................. H04W 72/04
See application file for complete search history.

(56) References Cited

U.S. PATENT DOCUMENTS 8,594,047 B2 * 11/2013 Gao ................. H04W 36/0077
370/331
8,666,417 B2 * 3/2014 Narasimha ........ H04W 36/0055
455/436
(Continued)

FOREIGN PATENT DOCUMENTS

JP 2011-234133 A 11/2011
JP 2011-250173 A 12/2011
(Continued)

OTHER PUBLICATIONS

International Search Report for corresponding International Application No. PCT/JP2013/064773, mailed Jul. 30, 2013 (3 pages).
(Continued)

*Primary Examiner* — Vladimir Magloire
*Assistant Examiner* — Frank Donado
(74) *Attorney, Agent, or Firm* — Osha Liang LLP

(57) ABSTRACT

A radio base station provides user equipments with system information regarding a radio base station that does not broadcast the system information. The radio base station wirelessly communicating with user equipments does not have a function to broadcast system information including information necessary for user equipments to connect with the radio base station to user equipments. The radio base station transmits the system information to a neighboring radio base station in order to assist the user equipments to connect with the radio base station. The neighboring radio base station transmits the system information to the user equipments having connected with the neighboring radio base station.

8 Claims, 34 Drawing Sheets

(51) Int. Cl.
*H04W 48/10* (2009.01)
*H04W 92/20* (2009.01)
*H04W 16/32* (2009.01)

(56) References Cited

U.S. PATENT DOCUMENTS

| | | | | |
|---|---|---|---|---|
| 2012/0106516 | A1* | 5/2012 | Jung | H04W 48/08 370/331 |
| 2012/0157096 | A1* | 6/2012 | Baek | H04B 17/318 455/434 |
| 2012/0218966 | A1 | 8/2012 | Yamazaki et al. | |
| 2012/0309400 | A1* | 12/2012 | Inumaru | H04W 76/002 455/438 |
| 2013/0165130 | A1 | 6/2013 | Wu et al. | |
| 2013/0273926 | A1* | 10/2013 | Peng | H04B 7/15528 455/450 |

FOREIGN PATENT DOCUMENTS

| | | |
|---|---|---|
| WO | 2011/052774 A1 | 5/2011 |
| WO | 2011137775 A1 | 11/2011 |

OTHER PUBLICATIONS

Notice of Reasons for Rejection for Japanese Patent Application No. 2012-128882, mailed Sep. 2, 2014 (7 pages).

NTT Docomo; "On the need for additional carrier types in Rel-11 CA;" 3GPP TSG RAN WG1 Meeting #66bis, R1-113289; Zhuhai, China; Oct. 10-14, 2011 (4 pages).

Panasonic; "Channels and signals for additional carrier type;" 3GPP TSG-RAN WG1 Meeting #68bis, R1-121140; Jeju, Korea; Mar. 26-30, 2012 (3 pages).

3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10);" Mar. 2011 (197 pages).

3GPP TS 36.331 V10.3.0; "3rd Generation Partnership Project; Technical Specification Group Radio Access Network; Evolved Universal Terrestrial Radio Access (E-UTRA); Radio Resource Control (RRC); Protocol specification (Release 10);" Sep. 2011 (297 pages).

Extended European Search Report issued in the counterpart European Patent Application No. 13801247.1, mailed Feb. 2, 2016 (12 pages).

NTT Docomo, Inc.; "Requirements, Candidate Solutions & Technology Roadmap for LTE Rel-12 Onward"; 3GPP Workshop on Release 12 and onwards, RWS-120010; Ljubljana, Slovenia; Jun. 11-12, 2012 (27 pages).

Mahmud K et al.; "Basic Access Network Assisted IP Mobility and AAA in MIRAI Architecture"; IEEE 55th Vehicular Technology Conference, vol. 4, pp. 1660-1664; May 6, 2002 (5 pages).

Hiroyuki Ishii et al.; "A Novel Architecture for LTE-B: C-plane/ U-plane Split and Phantom Cell Concept"; IEEE 2012 Globecom Workshops, pp. 624-630; Dec. 3, 2012 (7 pages).

* cited by examiner

RADIO BASE STATION AND RADIO COMMUNICATION SYSTEM

FIELD OF THE INVENTION

The present invention relates to a radio base station and to a radio communication system.

BACKGROUND ART

In the LTE (Long Term Evolution) of the 3GPP (Third Generation Partnership Project), connection (establishment of connection at layers 1 and 2) between a user equipment (UE) and a radio base station (eNB (evolved Node B)) is performed by the following procedure.

1. Cell Discovery and Synchronization

The user equipment detects synchronization signals called the PSS (Primary Synchronization Signal) and the SSS (Secondary Synchronization Signal) sent from the radio base station, and identifies the subframe timing (subframe number) of the radio base station and the cell ID (PCI (Physical Cell ID)) of the radio base station.

2. Acquisition of System Information

The user equipment acquires system information necessary for connecting with the radio base station. The system information stimulated in the LTE includes the MIB (Master Information Block) and the SIBs (System Information Blocks), as described in Non-patent Document 1 (Section 7.4) and Non-patent Document 2 (Section 5.2). System information necessary for connecting with the radio base station includes the MIB, SIB1 (System Information Block Type 1), and SIB2. The MIB describes the bandwidth used by the radio base station, information necessary for receiving the PDCCH (physical downlink control channel), and the SFN (system frame number). SIB1 indicates restriction information indicating whether access to the radio base station by user equipments is currently permitted or inhibited, and schedule information on other SIBs. SIB2 indicates common channels for which the user equipment connects with the radio base station and information on the common channels.

The user equipment detects the MIB using the identified subframe timing, and acquires the bandwidth, information necessary for downlink reception, and the system frame number. Then, using information acquired from the MIB, the user equipment detects SIB1 and acquires the schedule information on other SIBs. Furthermore, using the information acquired from SIB1, the user equipment detects the other SIBs and acquires information for accessing the radio base station.

3. Radio Link Establishment According to Random Access Procedure

After acquisition of the system information, the user equipment sends a random access preamble to the radio base station, and receives a random access response from the radio base station. The user equipment also sends the ID of the user equipment itself, so that the radio base station solves collision of multiple user equipments even if multiple user equipments has sent the same preamble.

RELATED ART DOCUMENTS

Non-Patent Documents

Non-patent Document 1: 3GPP TS 36.300 V10.3.0 (2011-03), 3rd Generation Partnership Project; Technical Specification Group Radio Access Network; Evolved Universal Terrestrial Radio Access (E-UTRA) and Evolved Universal Terrestrial Radio Access Network (E-UTRAN); "Overall description"; Stage 2 (Release 10), March 2011

Non-patent Document 2: 3GPP TS 36.331 V10.3.0 (2011-09), 3rd Generation Partnership Project; Technical Specification Group Radio Access Network; Evolved Universal Terrestrial Radio Access (E-UTRA); "Radio Resource Control (RRC)"; Protocol specification, (Release 10), September 2011

SUMMARY OF THE INVENTION

As described above, for radio link establishment with the radio base station, the user equipment must acquire system information used by the radio base station. In the LTE, generally, radio base stations have a function to broadcast system information to user equipments within the cell of the radio base station. However, if a radio base station does not have the function to broadcast system information, user equipments cannot access the radio base station. Specifically, user equipments cannot acquire SIB2, and cannot execute radio link establishment according to the random access procedure.

System information also includes information necessary for cell re-selection (SIB3), information on neighboring radio base stations (SIB4-SIB8), and information for ETWS (Earthquake and Tsunami Warning service) (SIB10 and SIB11). If a radio base station does not have a function to broadcast system information, user equipments cannot execute cell re-selection after the idle status or cannot receive information on the radio base station or advance warning announcement of earthquakes or tsunamis.

Accordingly, the present invention provides a radio base station and a radio communication system that can provide user equipments with system information regarding a radio base station that does not broadcast system information.

In a first aspect of the present invention, a radio base station wirelessly communicating with user equipments does not have a function to broadcast system information including information necessary for user equipments to connect with the radio base station to user equipments. The radio base station includes: a radio communicator configured to wirelessly communicate with the user equipments; an inter-base station communicator configured to communicate with at least one other radio base station; and a system information forwarder configured to transmit the system information through the inter-base station communicator to a neighboring radio base station in order to assist the user equipments to connect with the radio base station.

The radio base station does not have a function to broadcast system information, but transmits the system information to a neighboring radio base station, whereby the neighboring radio base station forwards the system information to user equipments in order to assist the user equipments to connect with the radio base station. System information including information necessary for user equipments to connect with the radio base station includes the MIB, SIB1, and SIB2. Such system information may include other SIBs.

The radio base station may further include a response request transmitter configured to transmit a response request for requesting a response to other radio base stations through the inter-base station communicator; and a neighboring base station detector configured to detect a response from a neighboring radio base station, the response being a reply to the response request. The system information forwarder may transmit the system information to the neighboring radio base station, which has sent the response detected by the neighboring base station detector.

Thus, the radio base station that does not broadcast system information may search, for itself, a neighboring radio base station to which the system information should be forwarded.

The system information forwarder may transmit the system information to the neighboring radio base station notified by a higher node.

Thus, the higher node may inform the radio base station that does not broadcast system information of the neighboring radio base station to which the system information is forwarded.

The radio base station may include a neighboring base station detector configured to detect a report by which the neighboring radio base station notifies of presence of the neighboring radio base station itself. The system information forwarder may transmit the system information to the neighboring radio base station, which has sent the report detected by the neighboring base station detector.

Thus, the neighboring radio base station to which the system information is forwarded may inform the radio base station that does not broadcast system information of the neighboring radio base station. In this case, the neighboring radio base station may inform the radio base station that does not broadcast system information of the presence of the neighboring radio base station in accordance with a request from a user equipment that has discovered the radio base station that does not broadcast system information and will connect with the radio base station.

The system information forwarder may periodically transmit the system information to the neighboring radio base station.

The system information may be changed, but by transmitting the system information periodically to the neighboring radio base station, the neighboring radio base station can receive the updated latest system information of the radio base station that does not broadcast system information and can forward it to the user equipment.

The radio base station may include a system information change detector configured to detect change in the system information. The system information forwarder may transmit the system information to the neighboring radio base station in a case in which the system information change detector has detected change in the system information.

Again in this case, the neighboring radio base station can receive the updated latest system information of the radio base station that does not broadcast system information and can forward it to the user equipment.

The radio base station may include a transmission request detector configured to detect a system information transmission request by which the neighboring radio base station requests transmission of the system information. The system information forwarder may transmit the system information to the neighboring radio base station in a case in which the transmission request detector has detected the system information transmission request.

In this case, since the radio base station that does not broadcast system information forwards the system information to the neighboring radio base station only when the neighboring radio base station requests transmission of the system information, traffic can be minimized. In this case, the neighboring radio base station may send the system information transmission request to the radio base station that does not broadcast system information in accordance with a request from a user equipment that has discovered the radio base station that does not broadcast system information and will connect with the radio base station.

The radio base station may further include a system information difference detector configured to detect a difference between old system information and new system information in a case in which the system information has been changed. The system information forwarder may transmit the difference detected by the system information difference detector to the neighboring radio base station.

In this case, it is possible to reduce traffic between the radio base station that does not broadcast system information and the neighboring radio base station.

The radio base station may further include a system-information intra-cell transmitter configured to transmit post-connection system information to the user equipments through the radio communicator using dedicated channels dedicated for the user equipments after the user equipments has connected with the radio base station, the post-connection system information including at least any of information on restriction of connection with the radio base station, information necessary for re-connection with the radio base station, information on another radio base station, and advance warning announcement of earthquakes or tsunamis.

Although a user equipment has connected with the radio base station that does not broadcast system information, the radio base station does not broadcast the system information. However, the radio base station sends the system information to the user equipments using dedicated channels dedicated for the user equipments, so that the user equipments can know the system information of the radio base station. The information on restriction of connection with the radio base station is the restriction information transmitted by SIB1, the information necessary for re-connection with the radio base station is information transmitted by SIBS, the information on other radio base stations is information transmitted by SIB4-SIB8, and advance warning announcement of earthquakes or tsunamis is information transmitted by SIB10 and SIB11. Such system information may include the other SIB, i.e., SIB2. After connection with the radio base station, the user equipment can receive such pieces of the system information from the radio base station. The "post-connection system information" is meant to be updated system information if the system information has been updated after connection of the user equipment with the radio base station that does not broadcast system information, and to be non-updated system information if the system information has not been updated.

The system-information intra-cell transmitter may periodically transmit the system information to the user equipment.

The system information may be changed, but by transmitting the system information periodically to the user equipment, the user equipment can receive the updated latest system information of the radio base station that does not broadcast system information.

The radio base station may include a system information change detector configured to detect change in the system information. The system-information intra-cell transmitter may transmit the system information to the user equipments in a case in which the system information change detector has detected change in the system information.

Again in this case, the user equipment can receive the updated latest system information of the radio base station that does not broadcast system information.

The radio base station may include a second transmission request detector configured to detect a system information transmission request by which a user equipment requests transmission of the system information. The system-information intra-cell transmitter may transmit the system information to the user equipment in a case in which the second transmission request detector has detected the system information transmission request.

In this case, since the radio base station that does not broadcast system information transmits the system information to the user equipment only when the user equipment requests transmission of the system information, traffic can be minimized.

In a second aspect of the present invention, a radio base station wirelessly communicating with user equipments, includes: a radio communicator configured to wirelessly communicate with the user equipments; a neighboring-base-station system information receiver configured to receive neighboring-base-station system information, which is system information including information necessary for user equipments to connect with a neighboring radio base station, from the neighboring radio base station not having a function to broadcast system information to user equipments; and a neighboring-base-station system information transmitter configured to transmit the neighboring-base-station system information through the radio communicator to user equipments having connected with the radio base station in order to assist the user equipments to connect with the neighboring radio base station.

This radio base station receives neighboring-base-station system information from a neighboring radio base station that does not broadcast system information and transmits the neighboring-base-station system information to user equipments. Accordingly, it is possible to provide user equipments with the system information regarding a radio base station that does not broadcast the system information. System information including information necessary for user equipments to connect with the radio base station includes the MIB, SIB1, and SIB2. Such system information may include other SIBs.

The neighboring-base-station system information transmitter may periodically transmit the neighboring-base-station system information to the user equipments.

The system information may be changed, but by transmitting the neighboring-base-station system information periodically to the user equipments, the user equipments can receive the updated latest system information of the radio base station that does not broadcast system information.

The radio base station may further include a neighboring-base-station system information change detector configured to detect change in the neighboring-base-station system information received by the neighboring-base-station system information receiver. The neighboring-base-station system information transmitter may transmit the neighboring-base-station system information to the user equipments in a case in which the neighboring-base-station system information change detector has detected change in the neighboring-base-station system information.

Again in this case, the user equipment can receive the updated latest system information of the radio base station that does not broadcast system information.

The radio base station may further include a transmission request detector configured to detect a neighboring-base-station system information transmission request by which a user equipment requests transmission of the neighboring-base-station system information. The neighboring-base-station system information transmitter may transmit the neighboring-base-station system information to the user equipment in a case in which the transmission request detector has detected the neighboring-base-station system information transmission request.

In this case, the neighboring-base-station system information is sent to the user equipment on demand from the user equipment, so that traffic can be minimized.

A radio communication system according to the present invention includes the radio base station of the first aspect and the radio base station of the second aspect.

DESCRIPTION OF EMBODIMENTS

With reference to the accompanying drawings, the present invention will be described hereinafter.

Figure 1:
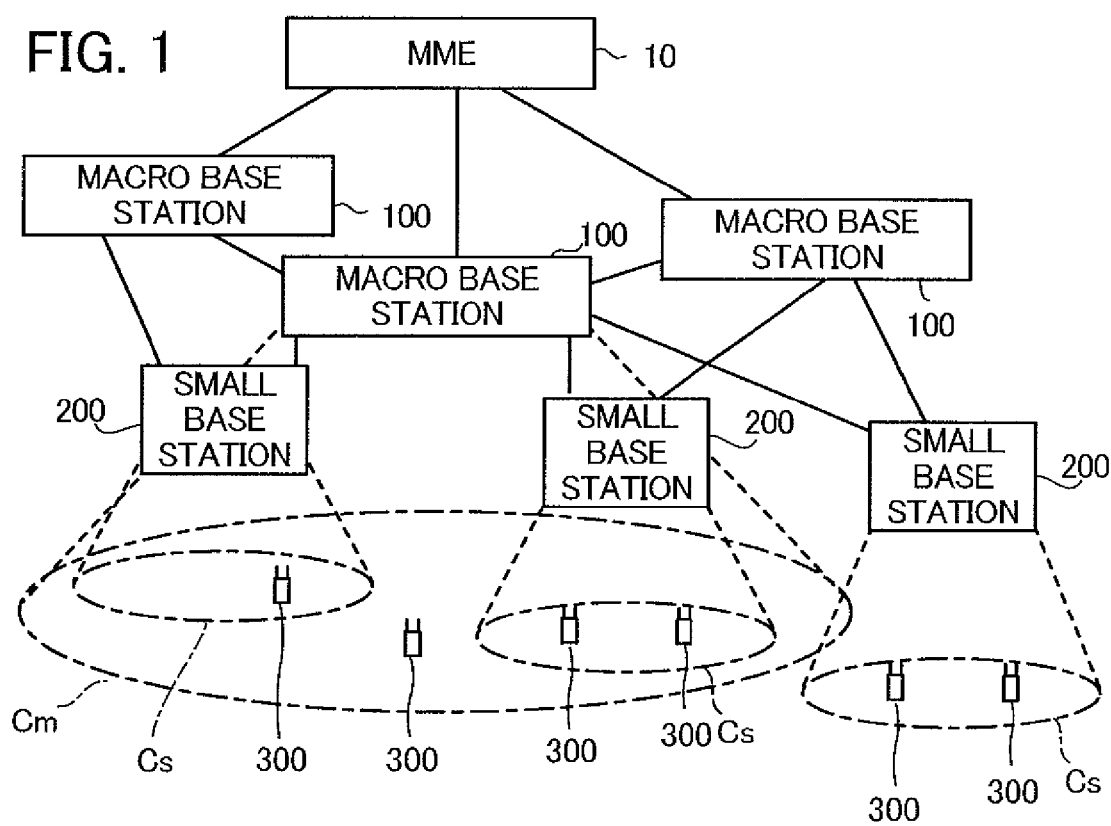
FIG. 1 is a schematic view showing a radio communication system in which the present invention is utilized.

As shown in FIG. 1, a radio communication system in which the present invention is utilized includes multiple macro base stations 100 and multiple small base stations 200. User equipments 300 are user equipments (UEs) in the LTE. Each of the macro base stations 100 and small base stations 200 can perform wireless communication with the user equipments 300.

Each of the macro base stations (radio base stations) 100 has a high transmission power and forms a macro cell Cm of which the radius is from several hundred meters to several tens of kilometers. Each of the small base stations (radio base stations) 200 has a low transmission power, which is less than the transmission power of the macro base stations 100, and forms a small cell Cs of which the radius is, for example, from several meters to several tens of meters. In this radio communication system, the macro base stations 100 and the small base stations 200 constitute a heterogeneous network in which multiple types of radio base stations having different transmission powers are deployed in a multi-layered way.

Each of the macro base stations 100 is directly connected with a mobile management entity (MME) 10. Each of the small base stations 200 is not directly connected with the MME 10, but can communicate with the MIME 10 via a macro base station 100 adjacent to the small base station 200. However, each of the small base stations 200 may be directly connected with the MME 10 to communicate with the MME 10. In addition, some of the small base stations 200 may not be connected with the MME 10 and may communicate with the MME 10 via macro base stations 100, whereas other small base stations 200 may be directly connected with the MME 10 to communicate with the MME 10.

In a manner similar to the macro base station 100 and existing low-power base stations (micro base stations, nano base stations, pico base stations, and femto base stations), the small base station 200 is a radio base station that, per se, can wirelessly communicate with the user equipments 300 and can execute voice communication or data communication with other communication apparatuses. However, in contrast to other types of radio base stations, many control functions of the small base station 200 depend on the macro base station 100 adjacent to the small base station 200, so that the small base station 200 does not have a function to broadcast the LTE system information to user equipments 300. As described above, the system information includes the MIB and SIBS including SIB1, SIB2, SIB3, etc. Therefore, the small base station 200 does not have a function to broadcast the MIB, SIB1, and SIB2 that are pieces of the system information necessary for user equipments 300 to connect with the small base station 200.

Figure 2:
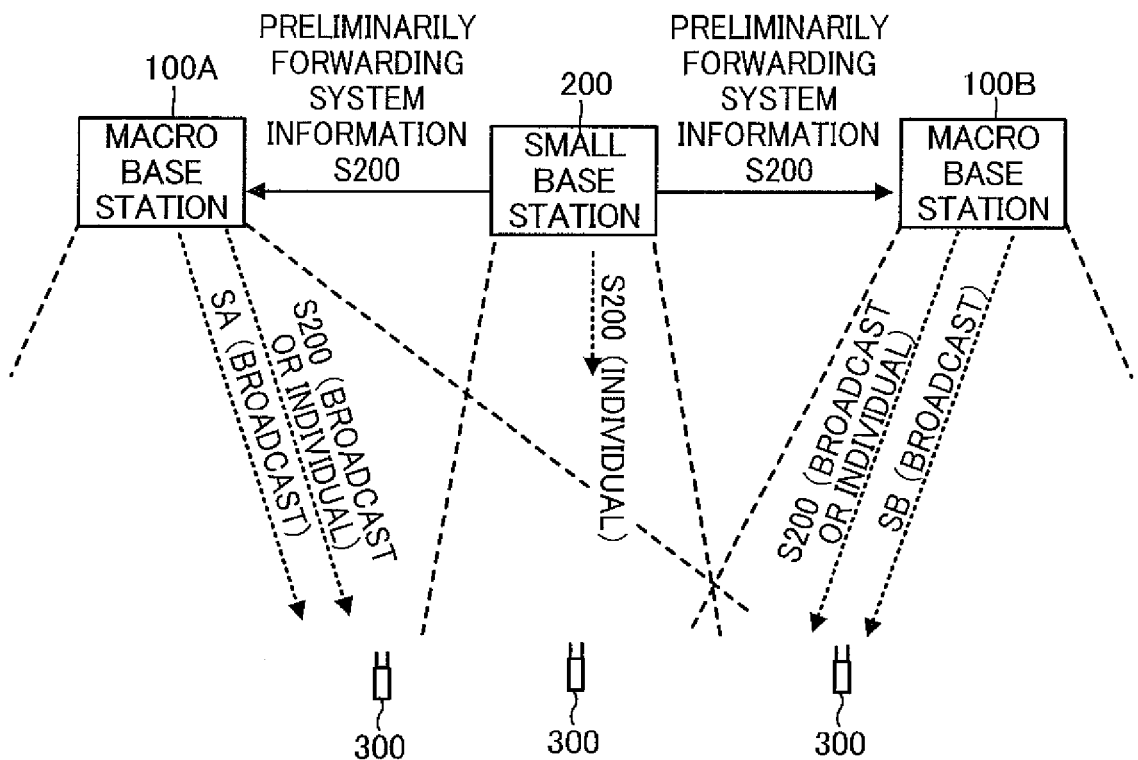
FIG. 2 is a schematic view showing an outline of the present invention.

Accordingly, in various embodiments that will be described later, the system information regarding the small base station 200 that does not broadcast system information is supplied to the user equipments 300. FIG. 2 is a schematic view showing an outline of the present invention. In an aspect of the present invention, the small base station 200, which does not have a function to broadcast system information S200 including information necessary for user equipments 300 to connect with the small base station 200 to user equipments 300, forwards the system information S200 of the small base station 200 to a macro base station 100 adjacent to the small base station 200 in order to assist the user equipments 300 to connect with the small base station 200. That is to say, the small base station 200 preliminarily forwards the system information S200 to a neighboring macro base station 100. Although the small base station 200 does not have a function to broadcast the system information S200, by virtue of transmission of the system information S200 to a macro base station 100, the neighboring macro base station 100 forwards the system information S200 to user equipments 300 in order to assist user equipments 300 to connect with the small base station 200. The system information S200, which includes information necessary for user equipments 300 to connect with the small base station 200, includes the MIB, SIB1, and SIB2. Such system information may include other SIBs.

In a second aspect of the present invention, macro base station 100 receives neighboring-base-station system information S200, which is system information S200 including information necessary for user equipments 300 to connect with a neighboring small base station 200, from the neighboring small base station 200 not having a function to broadcast neighboring-base-station system information S200 to user equipments 300; and transmits the neighboring-base-station system information S200 through a radio communicator 110 to user equipments 300 being connected with the macro base station 100 in order to assist the user equipments 300 to connect with the neighboring small base station 200. The macro base station 100 receives neighboring-base-station system information S200 from neighboring small base stations 200, which do not broadcast system information S200, and transmits the neighboring-base-station system information S200 to user equipments 300. Accordingly, it is possible to provide user equipments 300 with the system information regarding the small base stations 200, which do not broadcast the system information S200.

As shown in FIG. 2, the macro base station 100A broadcasts system information SA of the macro base station 100A itself to user equipments 300 located within the cell of the macro base station 100A. In addition, the macro base station 100A transmits system information S200 of the small base station 200 to user equipments 300 located within the cell of the macro base station 100A. Similarly, the macro base station 100B broadcasts system information SB of the macro base station 100B itself to user equipments 300 located within the cell of the macro base station 100B. In addition, the macro base station 100B transmits system information S200 of the small base station 200 to user equipments 300 located within the cell of the macro base station 100B. For transmitting the system information S200 from the macro base station 100, the macro base station 100 may broadcast the system information S200 into its own cell (for example, the macro base station 100 may send the system information S200 with the use of the broadcast channel), and may send the system information S200 individually to user equipments 300 that have requested system information S200 (for example, the macro base station 100 may send the system information S200 with the use of the dedicated channel).

A third aspect of the present invention is related to events after the user equipment 300 connects with the small base station 200. Even after a user equipment 300 connects with the small base station 200, which does not broadcast its system information S200, the small base station 200 does not broadcast its system information S200. However, the system information may change over time. The system information includes information on restriction of connection with the base station (indicating connection is permitted or inhibited) (the restriction information transmitted by SIB1), information necessary for re-connection with the base station (transmitted by SIB3), information on other base stations (transmitted by SIB4-SIB8), and advance warning announcement of earthquakes or tsunamis (transmitted by SIB10 and SIB11), which may change over time. If a user equipment 300 does not receive the restriction information on SIB1 and does not know it, when communication has been interrupted, the user equipment 300 cannot inform the user that communication has been interrupted due to system restriction. If a user equipment 300 does not receive SIB3 and does not know it, the user equipment 300 cannot execute cell re-selection after the idle status. If a user equipment 300 does not receive information on other base stations transmitted by SIB4-SIB8 and does not know it, the user equipment 300 encounters obstacles for handover to another base station. If a user equipment 300 does not receive advance warning announcement of earthquakes or tsunamis transmitted by SIB10 and SIB11 and does not know it, the user equipment 300 cannot inform the user of occurrence of earthquakes or tsunamis.

Accordingly, in the third aspect of the present invention, after a user equipment 300 connected with the small base station 200, the small base station 200 transmits post-connection system information S200 to the user equipment 300 using the dedicated channel dedicated for the user equipment, the post-connection system information including at least any of information on restriction of connection with the small base station 200, information necessary for re-connection with the small base station 200, information on macro base stations 100, and advance warning announcement of earthquakes or tsunamis. Since the small base station 200 transmits the system information S200 to the user equipment 300 using the dedicated channel dedicated for the user equipment 300, the user equipment 300 can know the system information S200 of the small base station 200. The information on restriction of connection with the small base station 200 is the restriction information transmitted by SIB1, the information necessary for re-connection with the small base station 200 is information transmitted by SIB3, the information on macro base stations 100 is information transmitted by SIB4-SIBS, and advance warning announcement of earthquakes or tsunamis is information transmitted by SIB10 and SIB11. Such system information S200 may include the other SIB, i.e., SIB2. After connection with the small base station 200, the user equipment 300 can receive such pieces of the system information from the small base station 200. The "post-connection system information" is meant to be updated system information if the system information has been updated after connection of the user equipment 300 with the small base station 200, which does not broadcast system information, and to be a non-updated system information if the system information has not been updated.

With reference to the accompanying drawings, various embodiments according to the present invention will be described hereinafter. In the following description, the same reference symbols are used to identify the same structural elements. Structural elements described for an embodiment will not be described in detail in subsequent embodiments.

First Embodiment

Figure 3:
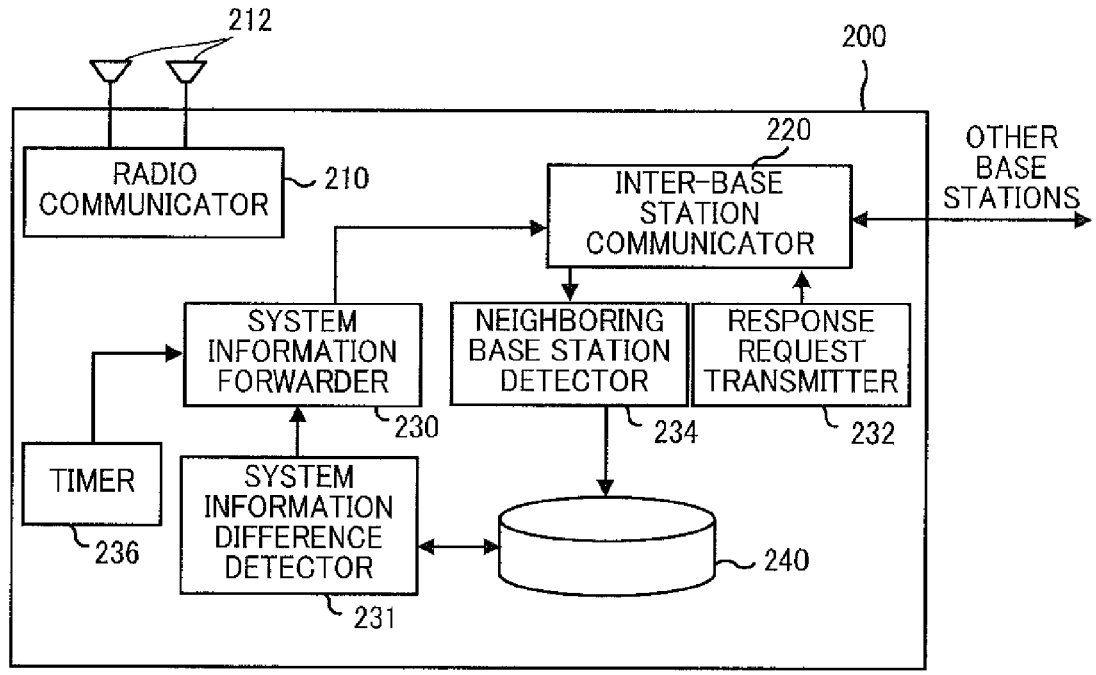
FIG. 3 is a block diagram showing a small base station according to a first embodiment of the present invention.

As shown in FIG. 3, the small base station 200 according to a first embodiment of the present invention includes at least one transceiving antenna 212, a radio communicator 210, an inter-base station communicator 220, a system information forwarder 230, a system information difference detector 231, a response request transmitter 232, a neighboring base station detector 234, a timer 236, and a memory 240.

The radio communicator 210 is an element for executing radio communication with mobile terminals 300, and includes a reception circuit for converting radio waves from mobile terminals 300 received at the transceiving antenna 212 to electrical signals, and a transmission circuit for converting electrical signals to radio signals and sending them from the transceiving antenna 212.

The inter-base station communicator 220 is an element for executing communication with the macro base stations 100, with which the small base station 200 itself is connected, and exchanges electrical signals with the macro base station 100. The inter-base station communicator 220 may communicate with the macro base stations 100 via cable or radio.

The system information forwarder 230, the response request transmitter 232, the neighboring base station detector 234, and the timer 236 are functional blocks accomplished by the fact that a CPU (central processing unit, not shown) in the small base station 200 executes a computer program stored in a memory (not shown) and operates in accordance with the computer program.

The system information forwarder 230 transmits the system information through the inter-base station communicator 220 to neighboring macro base stations 100 in order to assist the user equipments 300 to connect with the small base station 200. The system information difference detector 231 detects a difference between the old system information and the new system information in a case in which the system information of the small base station 200 has changed.

The response request transmitter 232 and the neighboring base station detector 234 are used for searching the neighboring macro base stations 100, which are destinations of the system information from the small base station 200. The response request transmitter 232 transmits a response request for requesting a response to macro base stations 100 through the inter-base station communicator 220. The response request sent from the response request transmitter 232 is a message designating the transmission source (the small base station 200), but not designating destinations. Upon receiving it, a macro base station 100 returns a response to the response request. The neighboring base station detector 234 detects the response from a neighboring macro base station 100, the response being a reply to the response request. The system information forwarder 230 transmits the system information to the neighboring macro base stations 100, which are the transmission source of the response detected by the neighboring base station detector 234. Thus, the small base station 200, which does not broadcast system information, may search, for itself, the neighboring radio base station to which the system information should be forwarded.

In order to transmit the system information to macro base stations 100 that are geographically close to the small base station 200, the response request transmitter 232 may wirelessly transmit the response request and the macro base stations 100 may wirelessly return the response. The response request transmitter 232 of the small base station 200 may identify only the transmission sources of the response that can be received and can be demodulated as the neighboring macro base stations 100. Alternatively, the response request transmitter 232 may identify, i.e., select only the transmission sources of the response of which the reception quality is good. For example, the response request transmitter 232 may measure electrical field intensities of responses from macro base stations 100, and may identify, i.e., select only the transmission sources of the response of which the electrical field intensity is higher than a threshold. Alternatively, the response request transmitter 232 may determine SIRs (signal-to-interference ratios) or SINRs (signal-to-interference noise ratios) of responses from macro base stations 100, and may identify, i.e., select only the transmission sources of the response of which the SIR or SINR is higher than a threshold. The system information forwarder 230 may send the system information only to the transmission source identified by the response request transmitter 232.

The timer 236 is used by the system information forwarder 230 for transmitting the system information periodically to the neighboring macro base stations 100. The memory 240 stores information indicating the neighboring macro base stations 100 identified by the response request transmitter 232 and the system information of the small base station 200.

Figure 4:
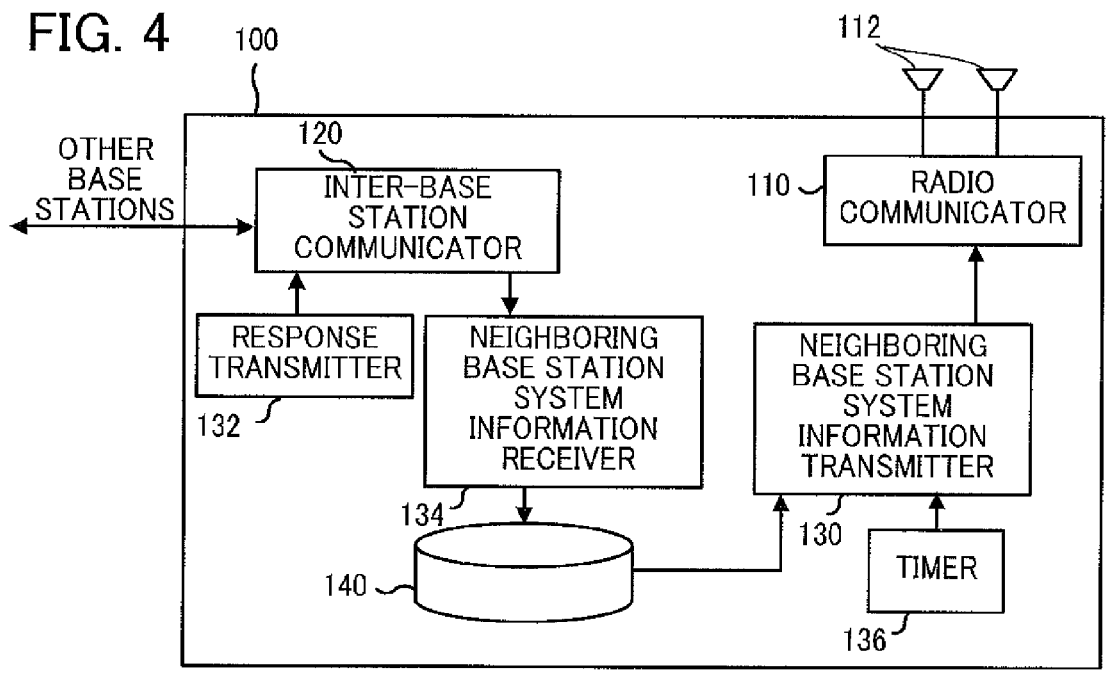
FIG. 4 is a block diagram showing a macro base station according to the first embodiment of the present invention.

As shown in FIG. 4, the macro base station 100 according to the first embodiment of the present invention includes at least one transceiving antenna 112, a radio communicator 110, an inter-base station communicator 120, a neighboring-base-station system information transmitter 130, a response transmitter 132, a neighboring-base-station system information receiver 134, a timer 136, and a memory 140.

The radio communicator 110 is an element for executing radio communication with mobile terminals 300, and includes a reception circuit for converting radio waves from mobile terminals 300 received at the transceiving antenna 112 to electrical signals, and a transmission circuit for converting electrical signals to radio signals and sending them from the transceiving antenna 112.

The inter-base station communicator 120 is an element for executing communication with other macro base stations and small base stations 200, with which the macro base station 100 itself is connected, and exchanges electrical signals with these base stations. The inter-base station communicator 120 may communicate with other base stations via cable or radio.

The neighboring-base-station system information transmitter 130, the response transmitter 132, the neighboring-base-station system information receiver 134, and the timer 136 are functional blocks accomplished by the fact that a CPU (not shown) in the macro base station 100 executes a computer program stored in a memory (not shown) and operates in accordance with the computer program.

The neighboring-base-station system information transmitter 130 transmits system information of neighboring small base stations 200 through the radio communicator 110 to user equipments 300 having connected with the macro base station 100 in order to assist the user equipments 300 to connect with the neighboring small base stations 200. The neighboring-base-station system information receiver 134 receives system information from neighboring small base stations 200, which does not have a function to broadcast the system information to user equipments 300.

Upon receiving the above-mentioned response request from a neighboring small base station 200 at the macro base station 100, the response transmitter 132 returns a response to the small base station 200, which is the transmission source of the response request. As described above, in order that the small base station 200 identify the macro base stations 100 that are geographically close to the small base station 200, the response transmitter 132 may return the response wirelessly.

The timer 136 is used by the neighboring-base-station system information transmitter 130 for transmitting the system information periodically to user equipments 300. The memory 140 stores information indicating neighboring small base station 200 identified by the response transmitter 132, and the system information of the small base station 200. In a case in which there are multiple neighboring small base stations 200, information indicating a small base station 200 is associated with the system information of the small base station 200 and are stored in the memory 140.

Figure 5:
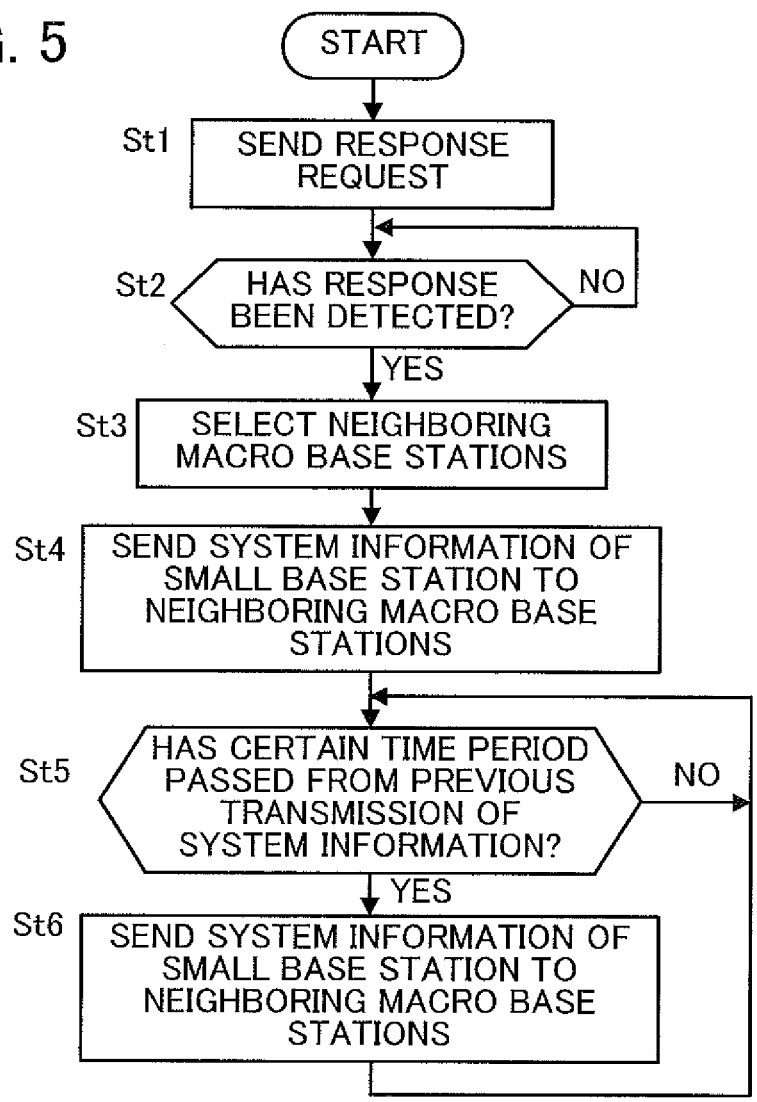
FIG. 5 is a flowchart showing an operation of the small base station shown in FIG. 4.

As shown in FIG. 5, in an operation of the small base station 200, the response request transmitter 232 of the small base station 200 sends the response request (step St1). Upon detecting the response from macro base stations 100 at the neighboring base station detector 234 (step St2), the neighboring base station detector 234 selects the macro base stations 100 for which the system information of the small base station 200 should be destined (step St3). At step St3, as described above, the neighboring base station detector 234 identifies, i.e., selects neighboring macro base stations 100, and stores the identified macro base stations 100 in the memory 240.

The system information forwarder 230 retrieves the system information of the small base station 200 from the memory 240, and transmits the system information of the small base station 200 to the selected, i.e., the identified neighboring macro base stations 100 (step St4). Referring to the elapsed time counted by the timer 236, after a certain period of time has passed from the previous transmission of system information (step St5), the system information forwarder 230 retrieves information on the neighboring macro base stations 100 and the system information of the small base station 200 from the memory 240, and transmits the system information of the small base station 200 to the neighboring macro base stations 100 (step St6). Afterward, step St5 and step St6 are repeated.

Figure 6:
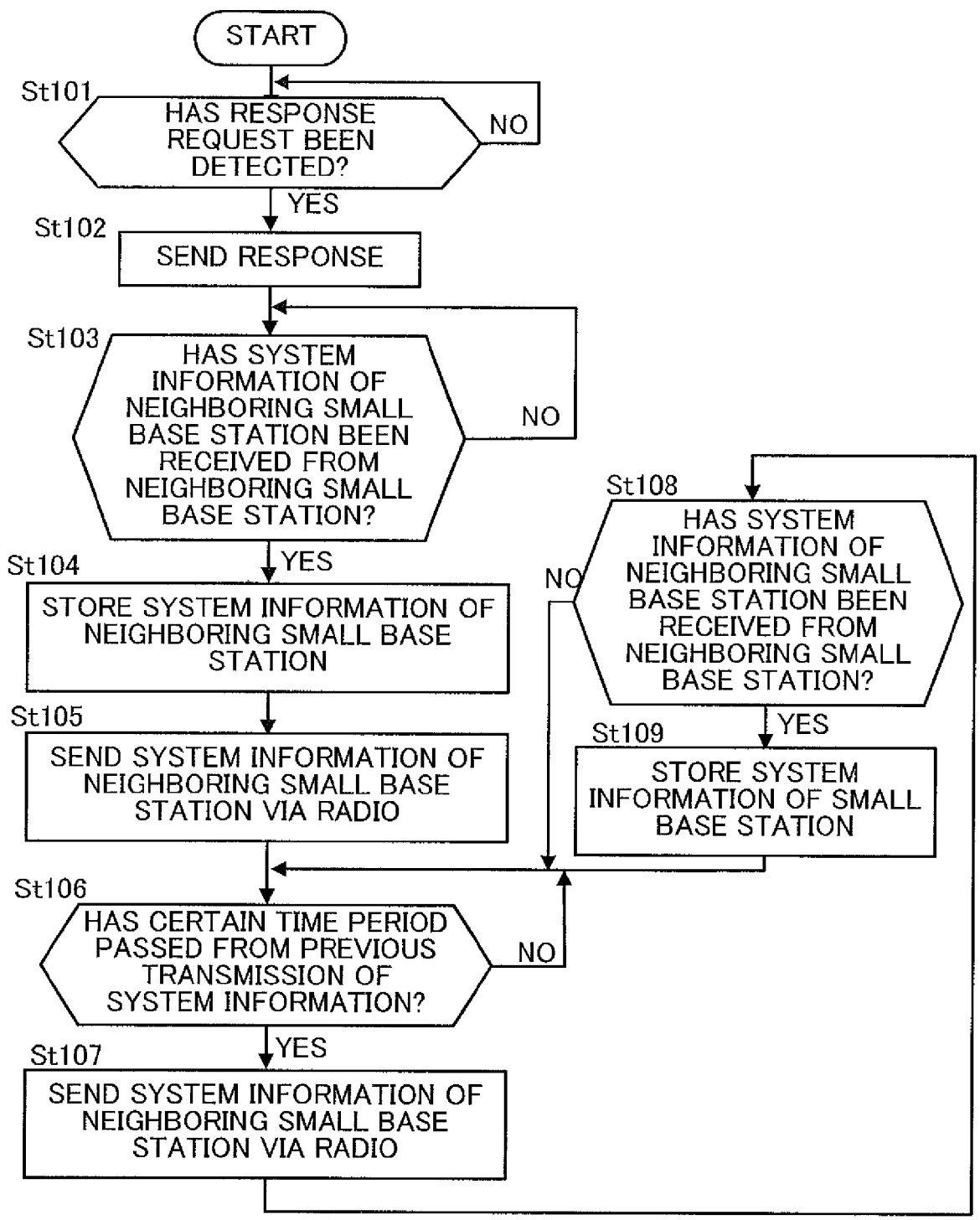
FIG. 6 is a flowchart showing an operation of the macro base station shown in FIG. 5.

At the initial transmission of system information to the macro base stations 100, the system information forwarder 230 should transmit the entire system information of the small base station 200. At subsequent transmissions of the system information to the macro base stations 100, the system information forwarder 230 may transmit the entire system information of the small base station 200. However, to reduce traffic, the system information forwarder 230 may preferably transmit the difference detected by the system information difference detector 231 (the difference between the old system information and the new system information) to the neighboring macro base stations 100. Having received the difference, the neighboring-base-station system information receiver 134 of the macro base station 100 may update the system information by rewriting the difference of the system information of the small base station 200 stored in the memory 140 at step St109 (FIG. 6). In a case in which the system information has not been changed, the system information forwarder 230 may transmit a message indicating that there is no change in the system information instead of transmitting the system information.

As shown in FIG. 6, in an operation of the macro base station 100, upon detecting the response request from a small base station 200 at the macro base station 100 (step St101), the response transmitter 132 sends a response (step St102). Upon receiving the system information of the neighboring small base station 200 from the neighboring small base station 200 at the neighboring-base-station system information receiver 134 (step St103), the neighboring-base-station system information receiver 134 stores the system information in the memory 140 in such a manner that the system information is associated with the small base station 200 (step St104), and the neighboring-base-station system information transmitter 130 transmits the system information of the small base station 200 for the user equipments 300 within the cell of the macro base station 100 (step St105).

In this embodiment, it is preferable that the neighboring-base-station system information transmitter 130 send the system information of the small base station 200 via radio, for example, with the use of the broadcast channel. In this case, the system information of the small base station 200 is received by all user equipments 300 connected with the macro base station 100. However, in accordance with a request of system information of a small base station 200 from a user equipment 300 that has discovered the small base station 200, which does not broadcast system information, and will connect with the small base station 200, the neighboring-base-station system information transmitter 130 may individually send the system information of the small base station 200 to only the user equipment 300 having sent the request, for example, with the use of the dedicated channel for the user equipment 300. In this case, the system information of the small base station 200 is received by only the user equipment 300 having sent the request.

Referring to the elapsed time counted by the timer 136, after a certain time period has passed from the previous transmission of system information (step St106), the timer 136 retrieves the system information on the neighboring small base station 200 from the memory 140, and transmits the system information of the neighboring small base station 200 via radio (step St107). Afterward, step St106 and step St107 are repeated.

Upon receiving system information of the neighboring small base station 200 from the neighboring small base station 200 again (step St108), the neighboring-base-station system information receiver 134 stores, i.e., updates the system information in such a manner that the system information is associated with the small base station 200 (step St109).

Figure 7:
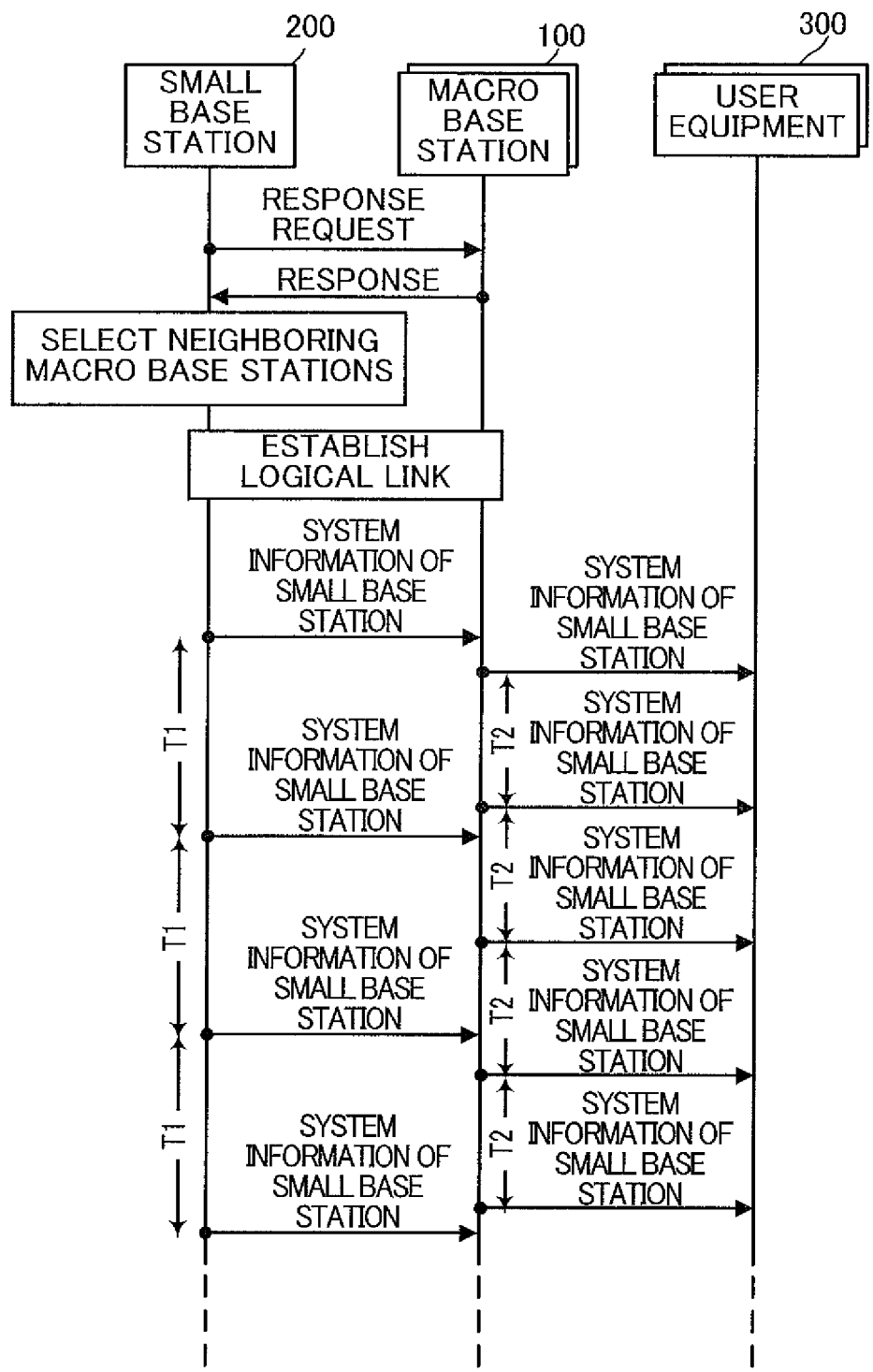
FIG. 7 is an information flow diagram showing operations in a radio communication system of the first embodiment.

FIG. 7 is an information flow diagram showing operations in the radio communication system of the first embodiment. As shown in FIG. 7, after selection of the neighboring macro base stations (step St3 in FIG. 5), the small base station 200 establishes radio links with the macro base stations 100, and sends the system information of the small base station 200 to the macro base stations 100. At certain intervals T1, the small base station 200 transmits the system information of the small base station 200 to the macro base stations 100.

Upon receiving the system information of the small base station 200 initially, the macro base station 100 send it to user equipments 300. Afterward, at certain intervals T2, the macro base station 100 transmits the system information of the small base station 200.

In this embodiment, since the system information forwarder 230 transmits the system information periodically to the neighboring macro base stations 100, the neighboring macro base stations 100 can receive the updated latest system information of the small base station 200, which does not broadcast the system information, and can forward it to user equipments 300. In addition, since the neighboring-base-station system information transmitter 130 periodically transmits the system information of the neighboring small base station 200 to user equipments 300, the user equipments 300 can receive the updated latest neighboring-base-station system information of the small base station 200, which does not broadcast the system information.

Second Embodiment

In a second embodiment, in contrast to the first embodiment, the small base station 200 does not search, for itself, the neighboring macro base stations 100 to which the system information should be forwarded. Accordingly, as shown in FIG. 8, the small base station 200 according to the second embodiment of the present invention does not need the response request transmitter 232 or the neighboring base station detector 234, and as shown in FIG. 9, the macro base station 100 according to the second embodiment of the present invention does not need the response transmitter 132.

Figure 8:
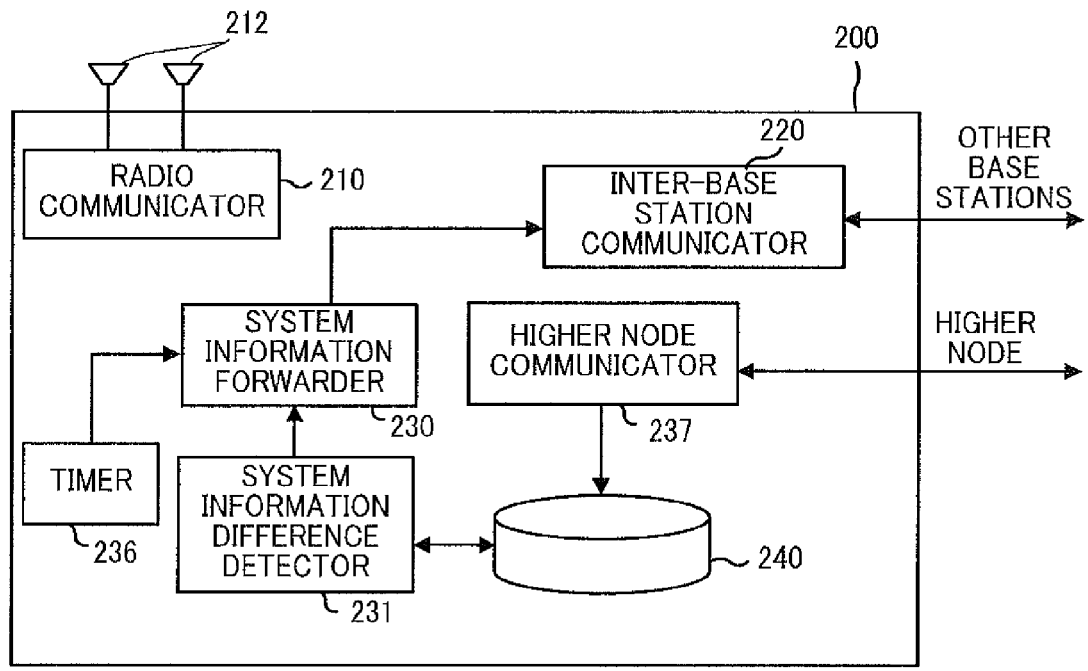
FIG. 8 is a block diagram showing a small base station according to a second embodiment of the present invention.
Figure 9:
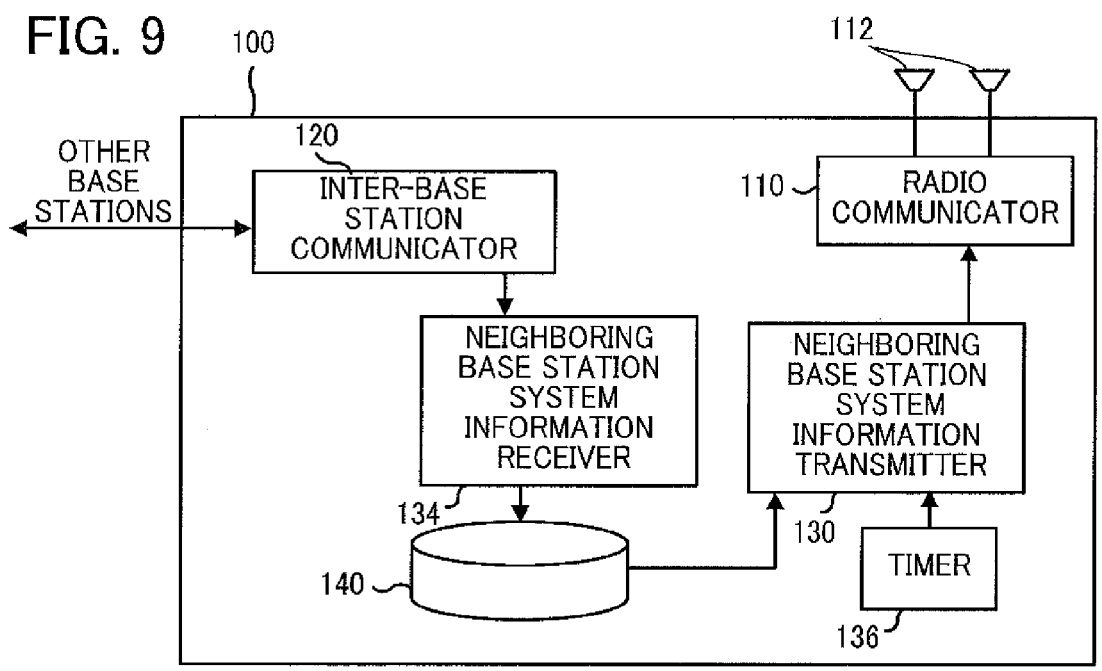
FIG. 9 is a block diagram showing a macro base station according to the second embodiment of the present invention.

As shown in FIG. 8, the small base station 200 according to the second embodiment includes a higher node communicator 237. The higher node communicator 237 is an element by which the small base station 200 communicates with a higher node. The higher node may be, for example, the MME 10 in FIG. 1, an OAM (Operation Administration and Maintenance), or another higher node. As described above, each of the small base stations 200 is not necessarily connected with the MME 10, but can communicate with the MME 10 via a macro base station 100 adjacent to the small base station 200. However, the second embodiment is preferably applied to the small base stations that are connected directly with the MME 10 for communicating with the MME 10.

The higher node communicator 237 of the small base station 200 is informed of macro base stations 100 that are adjacent to the small base station 200 from the higher node. The system information forwarder 230 transmits the system information of the small base station 200 to the neighboring macro base stations 100 transmitted by the higher node. Thus, the higher node may inform the small base station 200, which does not broadcast the system information, of the neighboring macro base stations 100, which are destinations of the system information of the small base station 200.

Figure 10:
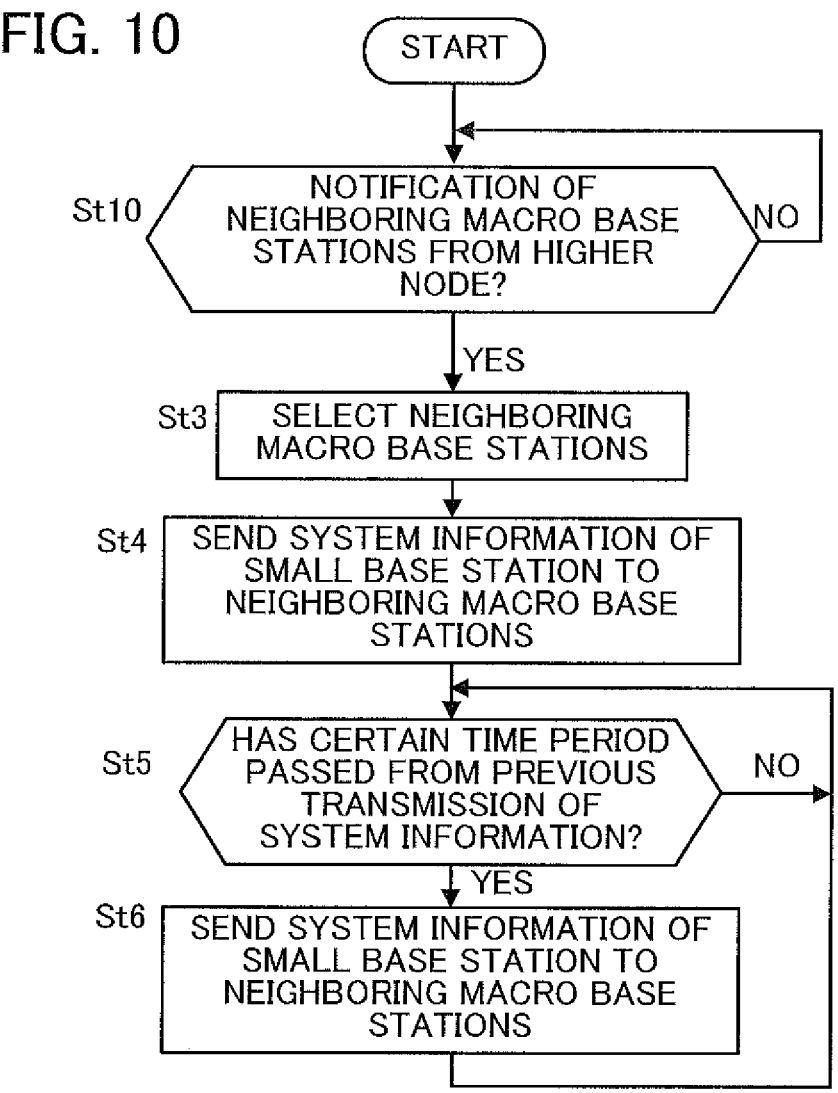
FIG. 10 is a flowchart showing an operation of the small base station shown in FIG. 8.

As shown in FIG. 10, in an operation of the small base station 200, upon receiving a notification of neighboring macro base stations 100 at the higher node communicator 237 from the higher node (step St10), the higher node communicator 237 selects the transmitted neighboring macro base stations 100 (step St3). At step St3, the higher node communicator 237 may select the macro base stations 100 transmitted by the higher node, and may store the selected macro base stations 100 in the memory 240. However, the small base station 200 may send a response request destined for the macro base stations 100 transmitted by the higher node, and may select only the macro base stations 100 that return the response or only the macro base stations 100 from which the quality of response is good (in this case, the small base station 200 includes the response request transmitter 232 and the neighboring base station detector 234 of the first embodiment, whereas the macro base station 100 includes response transmitter 132 of the first embodiment). Afterward, the operation of the small base station 200 may be the same as that in the first embodiment (FIG. 5).

Figure 11:
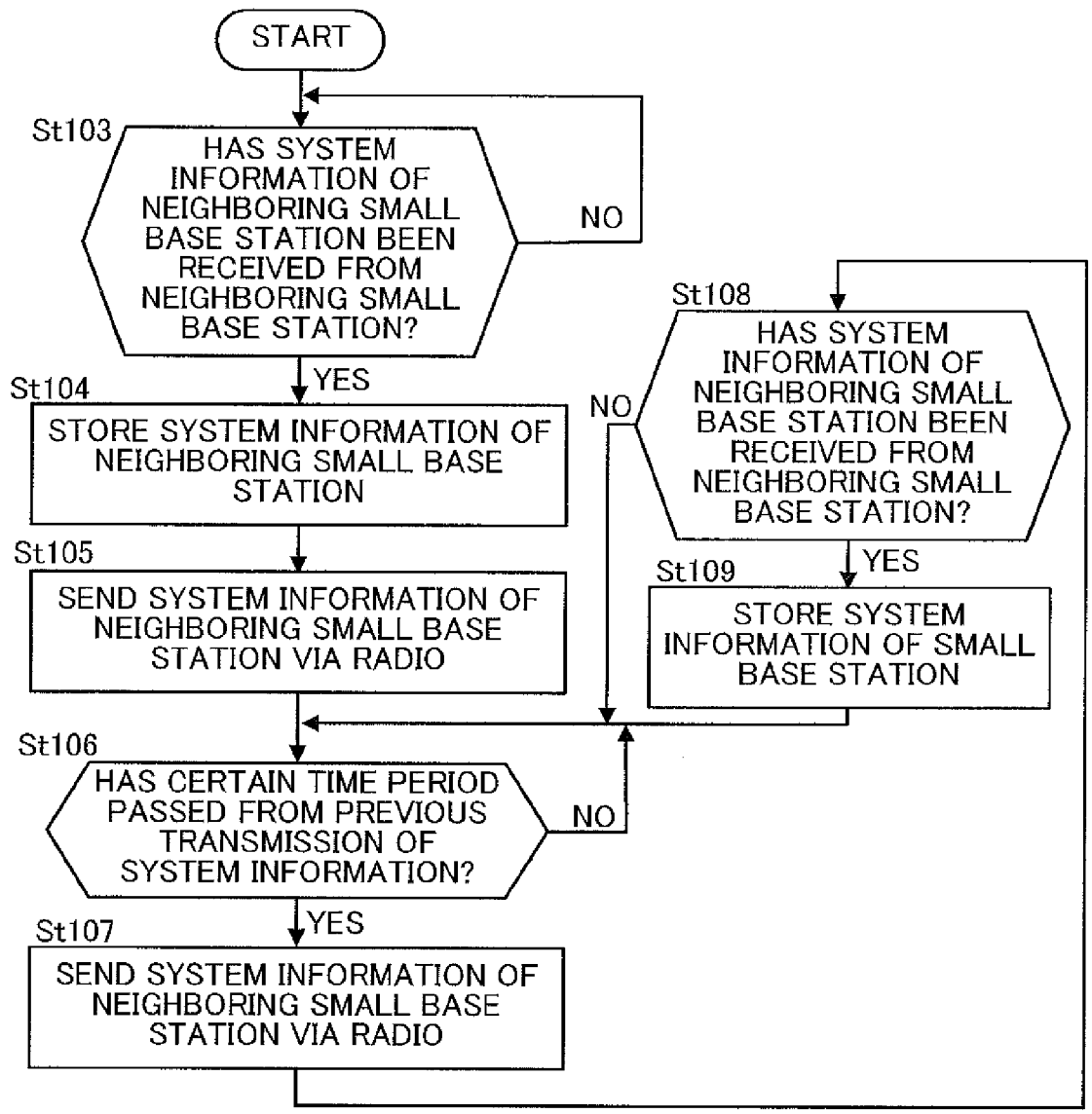
FIG. 11 is a flowchart showing an operation of the macro base station shown in FIG. 9.

FIG. 11 is a flowchart showing an operation of the macro base station 100 according to the second embodiment. This flowchart eliminates detecting the response request (step St101) and sending a response (step St102) written in the flowchart of FIG. 6 according to the first embodiment. Step St103 and subsequent operation in the macro base station 100 may be the same as those in the first embodiment. However, if the small base station 200 sends a response request destined for the macro base stations 100 transmitted by the higher node, and selects only the macro base stations 100 that return the response or only the macro base stations 100 from which the quality of response is good, the macro base station 100 may execute detecting the response request (step St101 in FIG. 6) and sending a response (step St102 in FIG. 6) as in a manner similar to the flowchart of FIG. 6.

Figure 12:
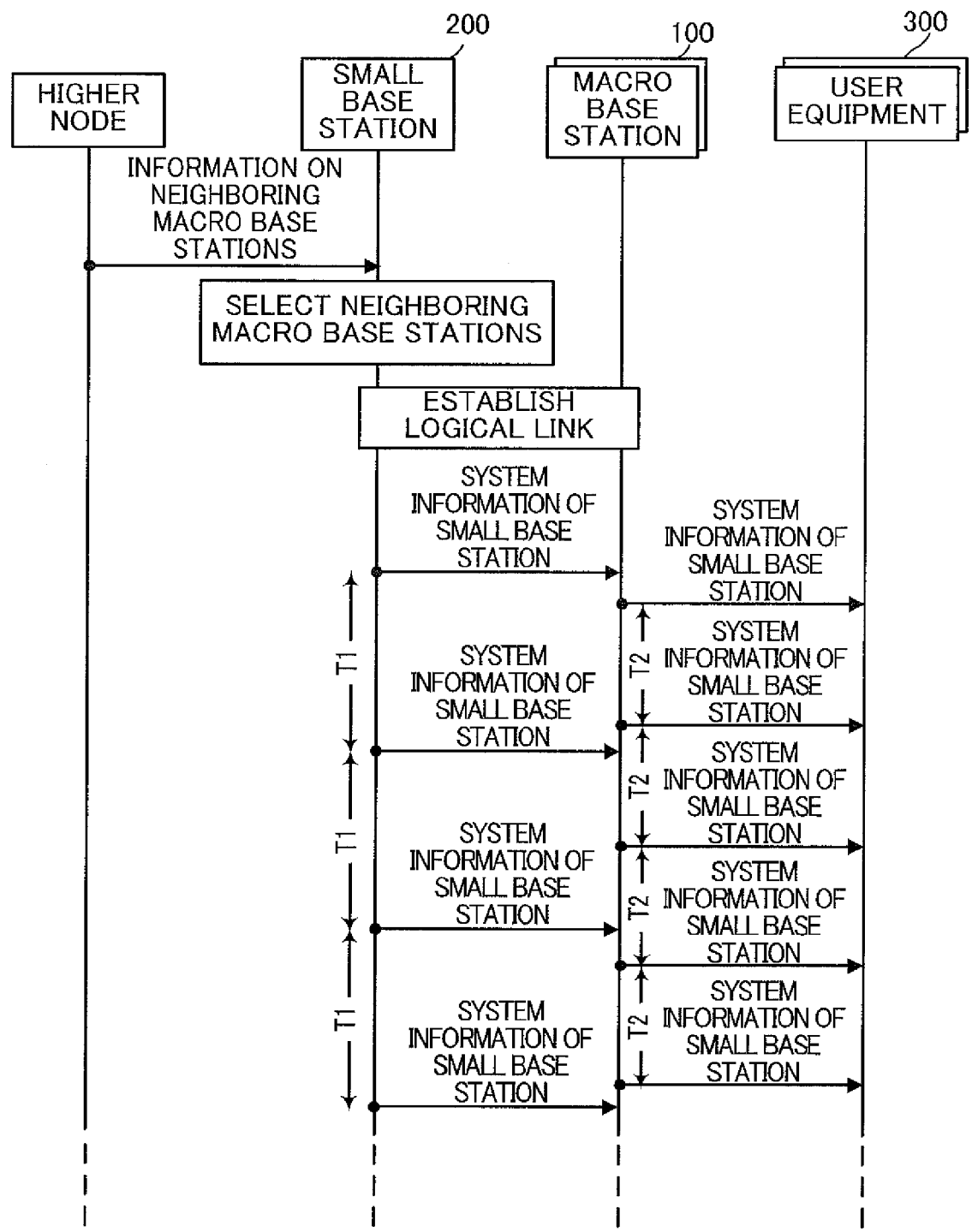
FIG. 12 is an information flow diagram showing operations in a radio communication system of the second embodiment.

FIG. 12 is an information flow diagram showing operations in the radio communication system of the second embodiment. The difference to the information flow diagram in FIG. 7 (the first embodiment) is that information on the neighboring macro base stations 100 is transmitted from the higher node instead of transmission of the response request and the response between the small base station 200 and the macro base stations 100.

In a manner similar to the first embodiment, at the second and subsequent transmissions of the system information to the macro base station 100, the system information forwarder 230 of the small base station 200 may transmit the entire system information of the small base station 200 or the difference detected by the system information difference detector 231 (the difference between the old system information and the new system information) to the macro base stations 100. Having received the difference, the neighboring-base-station system information receiver 134 of the macro base station 100 may update the system information by rewriting the difference of the system information of the small base station 200 stored in the memory 140 at step St109 (FIG. 6). In a case in which the system information has not been changed, the system information forwarder 230 may transmit a message indicating that there is no change in the system information instead of transmitting the system information.

In a manner similar to the first embodiment, the neighboring-base-station system information transmitter 130 of the macro base station 100 may send the system information of the small base station 200 via radio, for example, with the use of the broadcast channel. Alternatively, in accordance with a request for system information of the small base station 200 from a user equipment 300, the neighboring-base-station system information transmitter 130 may individually send the system information of the small base station 200 to only the user equipment 300 having sent the request, for example, with the use of the dedicated channel for the user equipment 300.

Third Embodiment

In a third embodiment, in contrast to the first embodiment, the small base station 200 does not search, for itself, the neighboring macro base stations 100 to which the system information should be forwarded. Accordingly, as shown in FIG. 13, the small base station 200 according to the third embodiment of the present invention does not need the response request transmitter 232 or the neighboring base station detector 234, and as shown in FIG. 14, the macro base station 100 according to the third embodiment of the present invention does not need the response transmitter 132.

Figure 13:
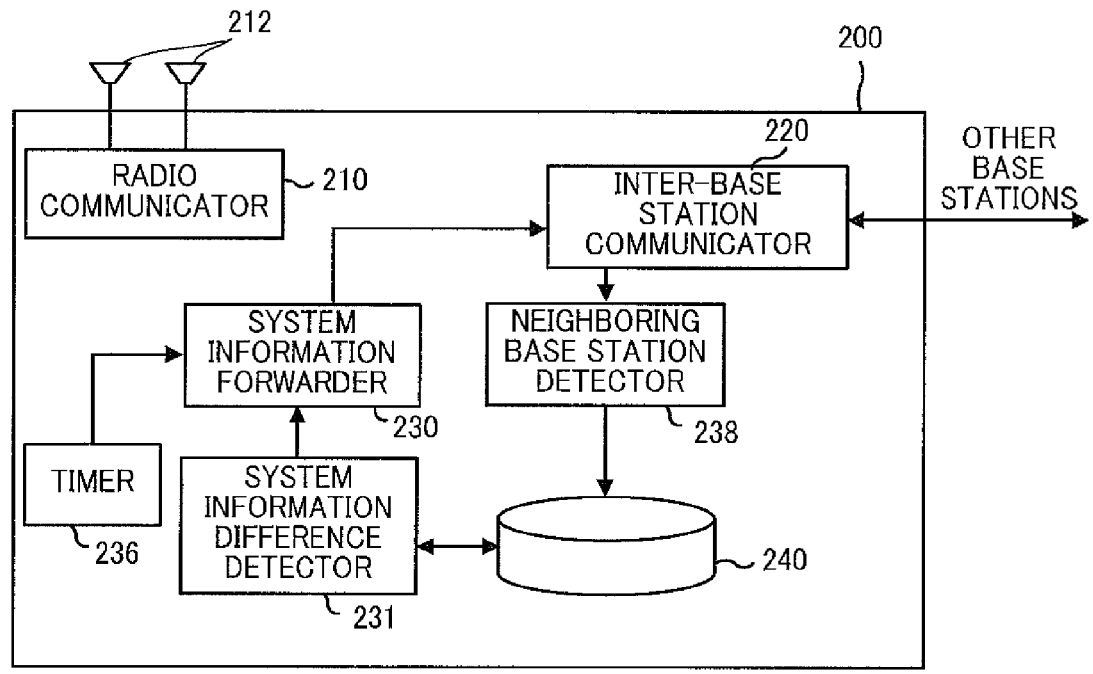
FIG. 13 is a block diagram showing a small base station according to a third embodiment of the present invention.

As shown in FIG. 13, the small base station 200 according to the third embodiment includes a neighboring base station detector 238. The neighboring base station detector 238 is a functional block accomplished by the fact that a CPU (not shown) in the small base station 200 executes a computer program stored in a memory (not shown) and operates in accordance with the computer program. The neighboring base station detector 238 detects a report by which a neighboring macro base station 100 notifies of the presence of the neighboring macro base station 100. In other words, the neighboring base station detector 238 is informed of macro base stations 100 that are adjacent to the small base station 200 from the neighboring macro base stations 100. The system information forwarder 230 transmits the system information of the small base station 200 to the neighboring macro base stations 100 transmitted by the neighboring macro base stations 100 themselves. Thus, the neighboring macro base stations 100, to which the system information should be forwarded, may inform the small base station 200, which does not broadcast the system information, of the neighboring macro base stations 100 themselves.

Figure 14:
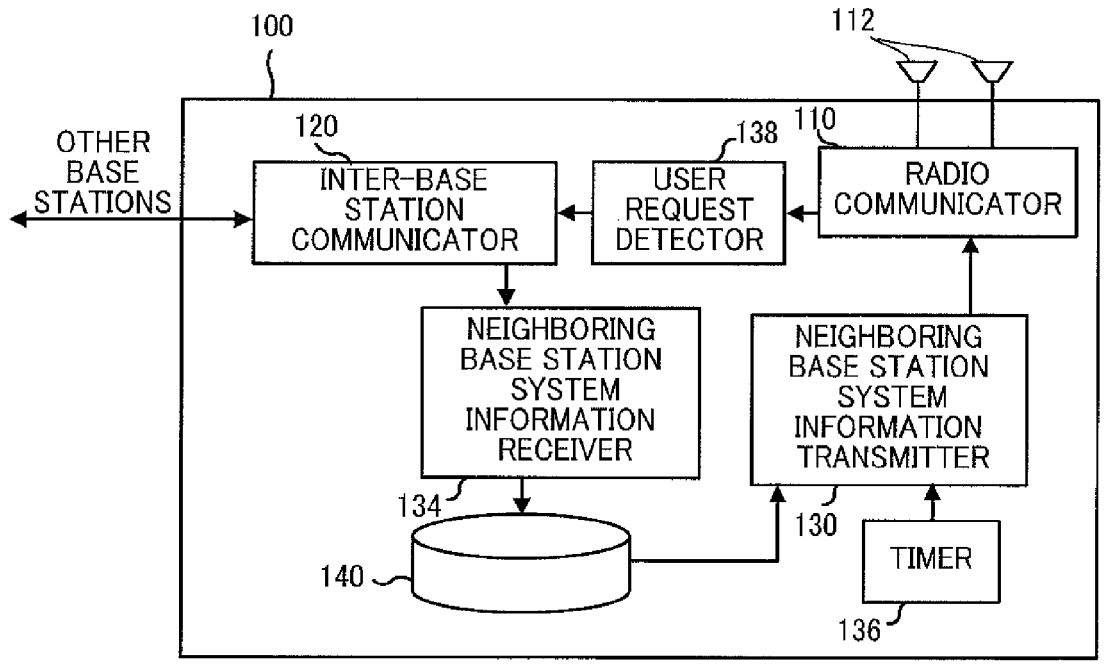
FIG. 14 is a block diagram showing a macro base station according to the third embodiment of the present invention.

As shown in FIG. 14, the macro base station 100 according to the third embodiment of the present invention includes a user request detector 138. The user request detector 138 is a functional block accomplished by the fact that a CPU (not shown) in the macro base station 100 executes a computer program stored in a memory (not shown) and operates in accordance with the computer program. The user request detector 138 detects a request for system information of the small base station 200 from a user equipment 300 that has discovered a small base station 200, which does not broadcast system information, and will connect with the small base station 200. For user equipments 300, which will connect with a small base station 200, it is necessary to receive the system information of the small base station 200. Accordingly, upon receiving the request, the user request detector 138 transmits, to the small base station 200, a report by which this neighboring macro base station 100 informs the small base station 200 of the presence of the neighboring macro base station 100 itself. The neighboring base station detector 238 of the small base station 200 detects the report from the macro base station 100.

Figure 15:
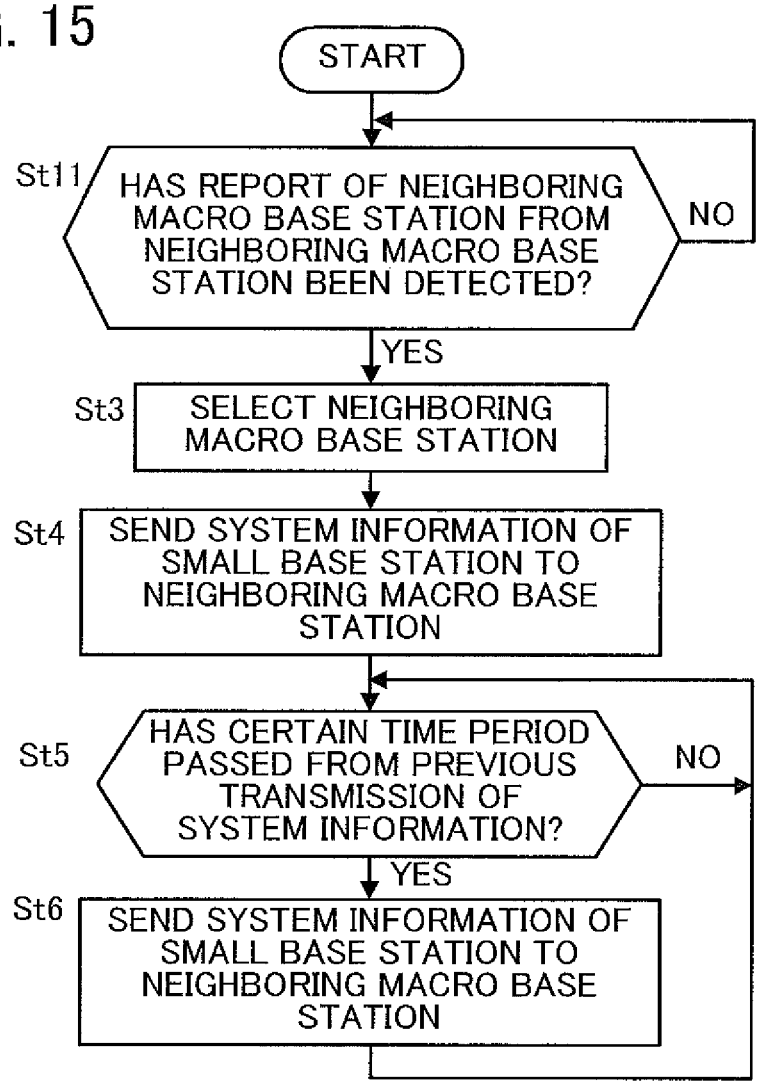
FIG. 15 is a flowchart showing an operation of the small base station shown in FIG. 13.

As shown in FIG. 15, in an operation of the small base station 200, upon receiving a report of the neighboring macro base station 100 at the neighboring base station detector 238 from the neighboring macro base station 100 (step St11), the neighboring base station detector 238 selects the transmitted neighboring macro base station 100 (step St3). At step St3, the neighboring base station detector 238 may select the macro base station 100 transmitted by the neighboring macro base station 100, and may store the selected macro base station 100 in the memory 240. Afterward, the operation of the small base station 200 may be the same as that in the first embodiment (FIG. 5).

Figure 16:
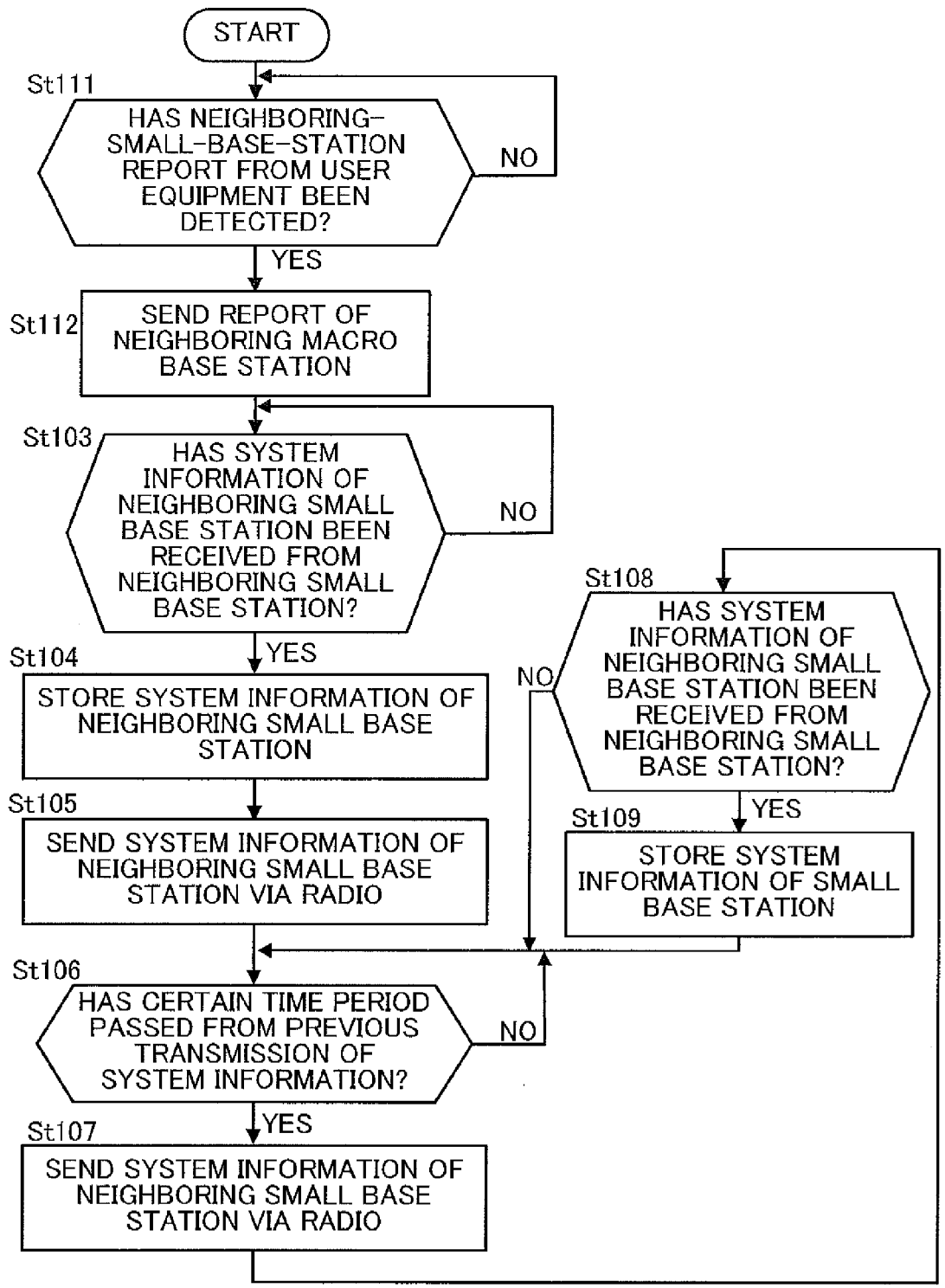
FIG. 16 is a flowchart showing an operation of the macro base station shown in FIG. 14.

As shown in FIG. 16, in an operation of the macro base station 100, if the user request detector 138 detects a neighboring-small-base-station report from a user equipment 300 (the above-mentioned request for system information of the small base station 200 from a user equipment 300) (step St111), the user request detector 138 transmits a report of the neighboring macro base station 100 (step St112). Step St103 and subsequent operation in the macro base station 100 may be the same as those in the first embodiment.

Figure 17:
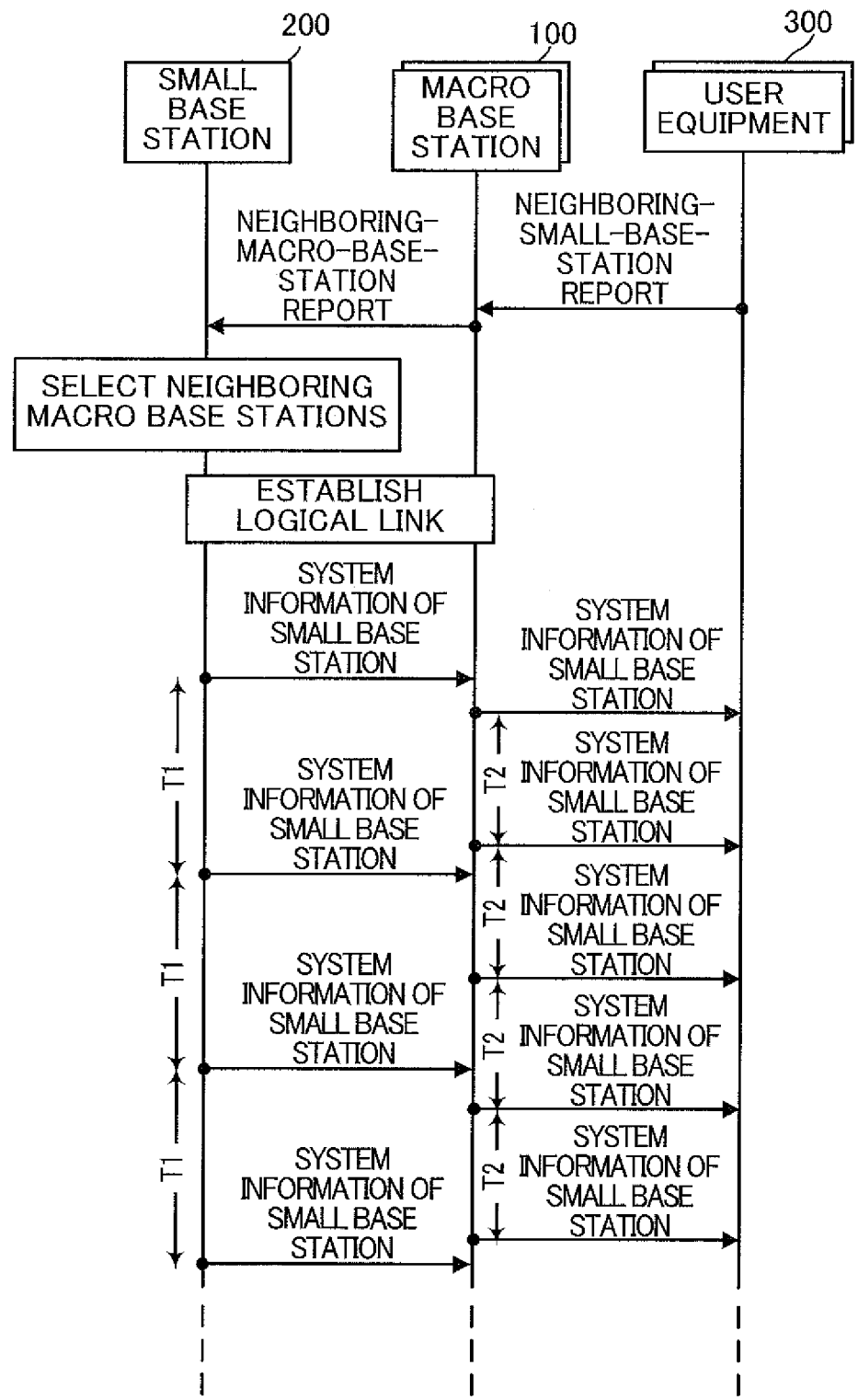
FIG. 17 is an information flow diagram showing operations in a radio communication system of the third embodiment.

FIG. 17 is an information flow diagram showing operations in the radio communication system of the third embodiment. The difference to the information flow diagram in FIG. 7 (the first embodiment) is that a neighboring-small-base-station report is transmitted from a user equipment 300 to a macro base station 100 and a report of the neighboring macro base station is transmitted from the macro base station 100 to the small base station 200, instead of transmission of the response request and the response between the small base station 200 and the macro base stations 100.

In a manner similar to the first embodiment, at the second and subsequent transmissions of the system information to the macro base station 100, the system information forwarder 230 of the small base station 200 may transmit the entire system information of the small base station 200 or the difference detected by the system information difference detector 231 (the difference between the old system information and the new system information) to the macro base stations 100. Having received the difference, the neighboring-base-station system information receiver 134 of the macro base station 100 may update the system information by rewriting the difference of the system information of the small base station 200 stored in the memory 140 at step St109 (FIG. 6). In a case in which the system information has not been changed, the system information forwarder 230 may transmit a message indicating that there is no change in the system information instead of the system information.

In a manner similar to the first embodiment, the neighboring-base-station system information transmitter 130 of the macro base station 100 may send the system information of the small base station 200 via radio, for example, with the use of the broadcast channel. Alternatively, in accordance with the request of system information of the small base station 200 (the small-base-station report) from a user equipment 300, the neighboring-base-station system information transmitter 130 may individually send the system information of the small base station 200 to only the user equipment 300 having sent the request (the small-base-station report), for example, with the use of the dedicated channel for the user equipment 300.

Fourth Embodiment

A fourth embodiment is a modification of the first embodiment. In the fourth embodiment, the small base station 200 does not periodically send the system information of the small base station to macro base stations 100, but sends the system information of the small base station to macro base stations 100 in a case in which the system information is changed.

Figure 18:
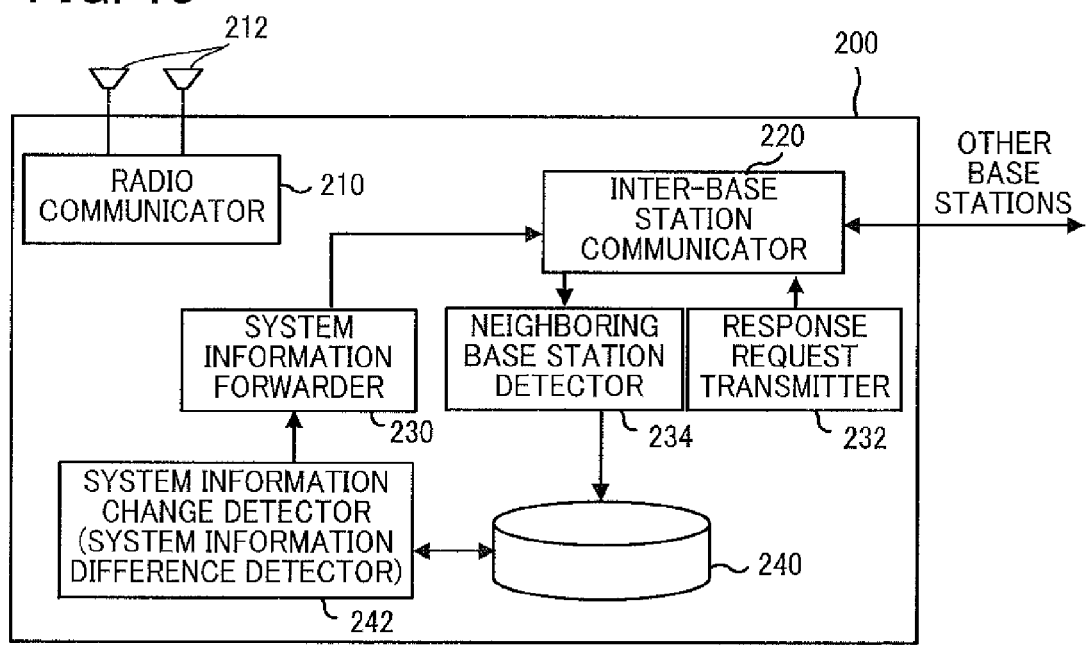
FIG. 18 is a block diagram showing a small base station according to a fourth embodiment of the present invention.

As shown in FIG. 18, the small base station 200 according to the fourth embodiment of the present invention includes a system information change detector (system information difference detector) 242. The system information change detector 242 is a functional block accomplished by the fact that a CPU (not shown) in the small base station 200 executes a computer program stored in a memory (not shown) and operates in accordance with the computer program. The system information change detector 242 detects change in the system information of the small base station 200. In a case in which the system information change detector 242 detects change in the system information of the small base station 200, the system information forwarder 230 transmits the system information of the small base station 200 to neighboring macro base stations 100. Accordingly, the updated latest system information of the small base station 200, which does not broadcast the system information, can be received by neighboring macro base stations 100, and in turn, can be forwarded to user equipments 300.

Figure 19:
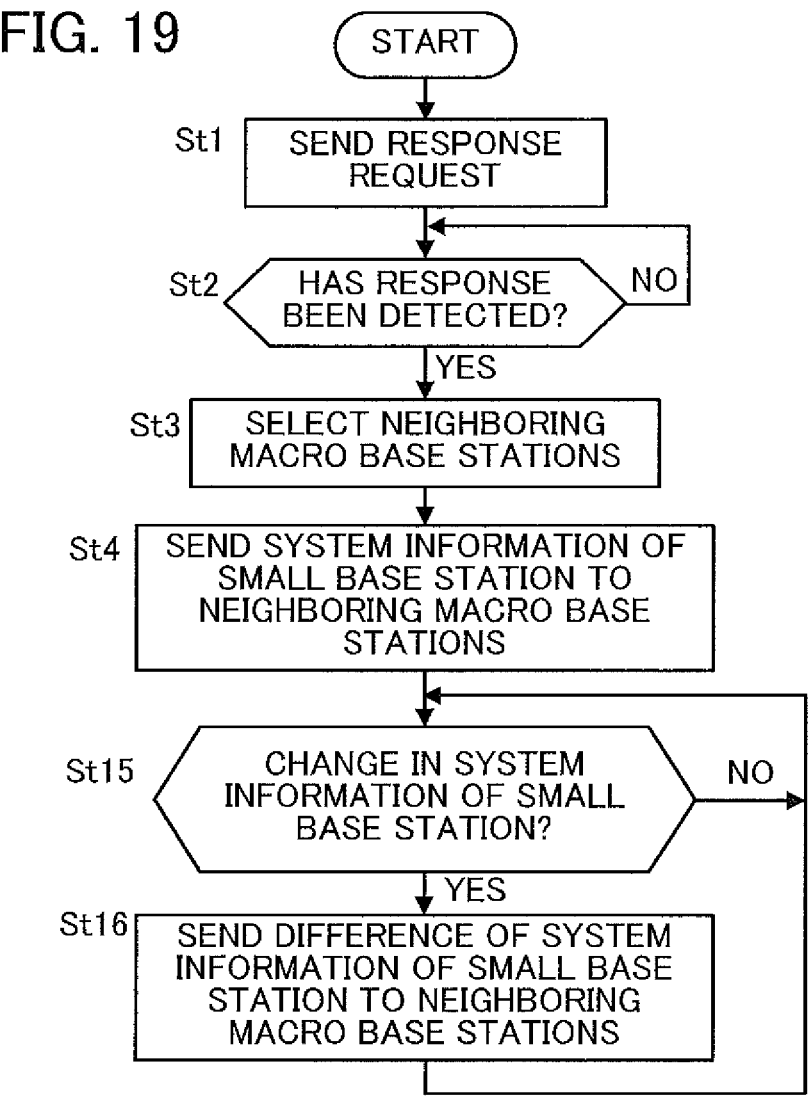
FIG. 19 is a flowchart showing an operation of the small base station shown in FIG. 18.

As shown in FIG. 19, in an operation of the small base station 100, steps St1 to St4 may be the same as those in FIG. 5 (the first embodiment). If the system information change detector 242 detects change in the system information (step St15), the system information forwarder 230 transmits the system information of the small base station 200 to neighboring macro base stations 100 (step St16). At the second and subsequent transmissions of the system information to the macro base station 100 (step St16), the system information forwarder 230 of the small base station 200 may transmit the entire system information of the small base station 200, but preferably, the system information forwarder 230 may sends the difference between the old system information and the new system information detected by the system information change detector (system information difference detector) 242 to neighboring macro base stations 100.

The macro base station 100 may be the same as the macro base station 100 of the first embodiment shown in FIG. 4. Operation of the macro base station 100 may be the same as that in the macro base station 100 of the first embodiment shown in FIG. 6. However, the neighboring-base-station system information receiver 134 of the macro base station 100 having received the difference preferably updates the system information stored in the memory 140 at step St109 (FIG. 6) by rewriting the difference of the system information of the small base station 200.

Figure 20:
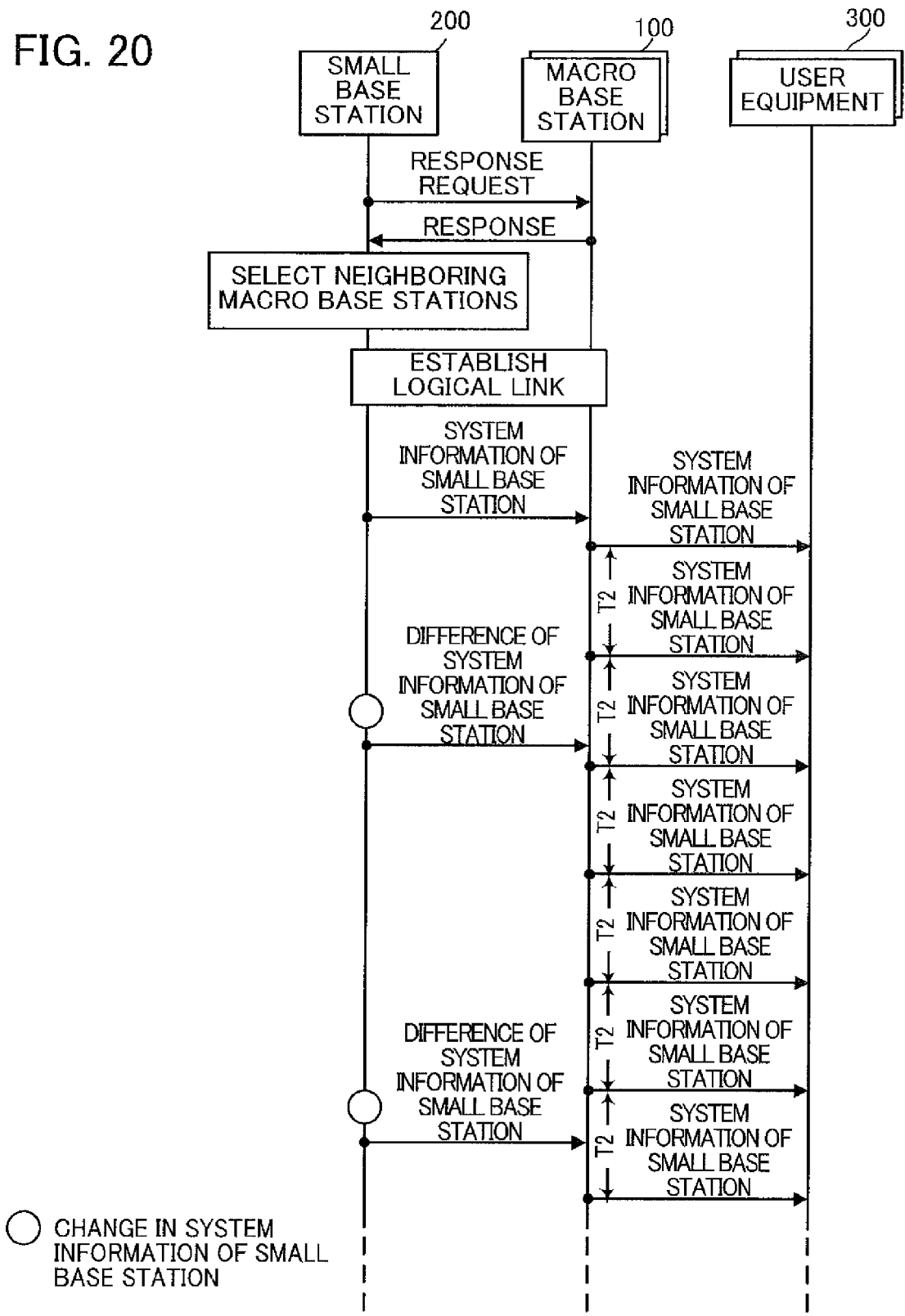
FIG. 20 is a block diagram showing an information flow diagram showing operations in a radio communication system of the fourth embodiment.

FIG. 20 is a block diagram showing an information flow diagram showing operations in a radio communication system of the fourth embodiment. The difference to the information flow diagram in FIG. 7 (the first embodiment) is that whenever the system information of the small base station 200 is changed, the difference of the system information of the small base station 200 is sent from the small base station 200 to macro base stations 100.

Figure 21:
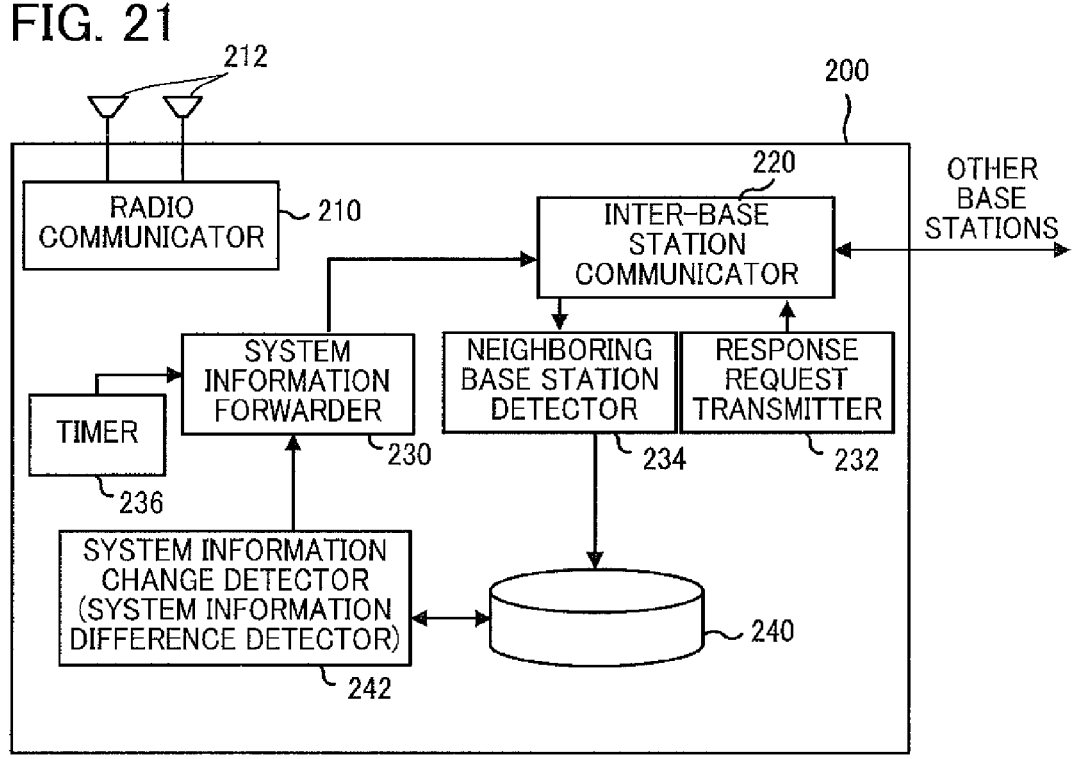
FIG. 21 is a block diagram showing a small base station of a modification of the fourth embodiment of the present invention.

The small base station 200 of the fourth embodiment may be modified as in the following. FIG. 21 is a block diagram showing a small base station of a modification of the fourth embodiment of the present invention. As shown in FIG. 21, the small base station 200 uses a timer 236 in addition to the system information change detector 242.

Figure 22:
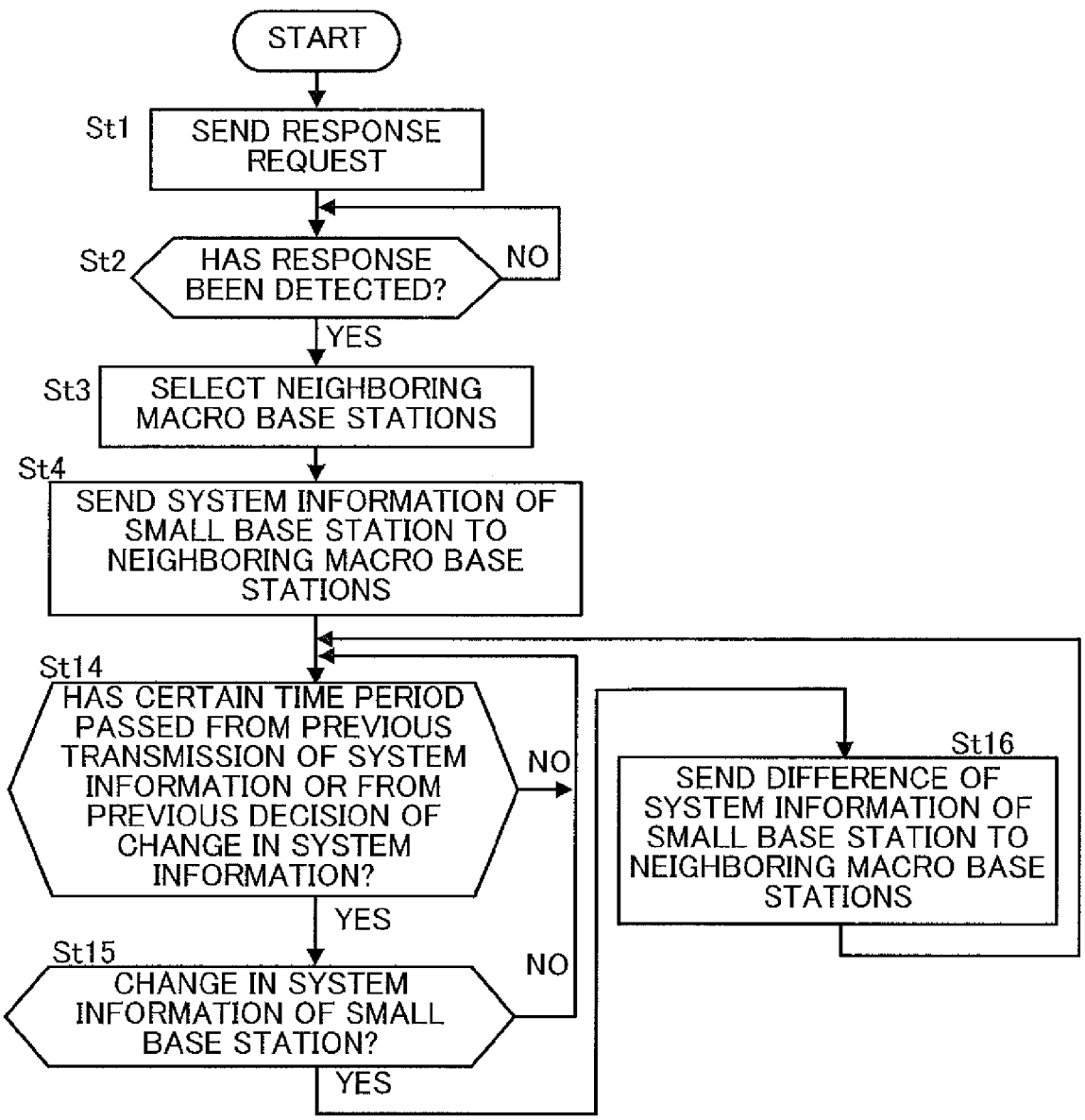
FIG. 22 is a flowchart showing an operation of the small base station shown in FIG. 21.

FIG. 22 is a flowchart showing an operation of the small base station shown in FIG. 21. Steps St1 to St4 may be the same as those in FIG. 5 (the first embodiment) and FIG. 19 (the fourth embodiment). Referring to the elapsed time counted by the timer 236, if the system information forwarder 230 decides that a certain time period has passed from the previous transmission of system information or from a previous decision of change in the system information (step St14), the system information change detector 242 decides whether or not the system information of the small base station 200 has been changed (step St15). If the decision at step St15 is negative, the operation returns to step St14, at which the system information forwarder 230 decides whether or not the certain time period has passed from the previous transmission of system information (step St16) or from the previous decision of change in the system information (step St15). If the decision at step St15 is affirmative, the system information forwarder 230 sends the system information of the small base station 200 to neighboring macro base stations 100 (step St16). Thus, by deciding periodically whether the system information of the small base station 200 has been changed, and by transmitting the system information only when the system information has been changed, traffic can be reduced. At the second and subsequent transmissions of the system information to the macro base station 100 (step St16), the system information forwarder 230 of the small base station 200 may transmit the entire system information of the small base station 200, but preferably, the system information forwarder 230 may send the difference between the old system information and the new system information detected by the system information change detector (system information difference detector) 242 to neighboring macro base stations 100.

Although the fourth embodiment and the modification of the fourth embodiment are modifications of the first embodiment, the second embodiment or the third embodiment may be modified by applying features of the fourth embodiment and the modification of the fourth embodiment to the second embodiment or the third embodiment. In other words, in the fourth embodiment and the modification of the fourth embodiment, the small base station 200 may transmit the system information of the small base station 200 to the macro base stations 100 that are transmitted by the higher node or the macro base stations 100.

Fifth Embodiment

Figure 23:
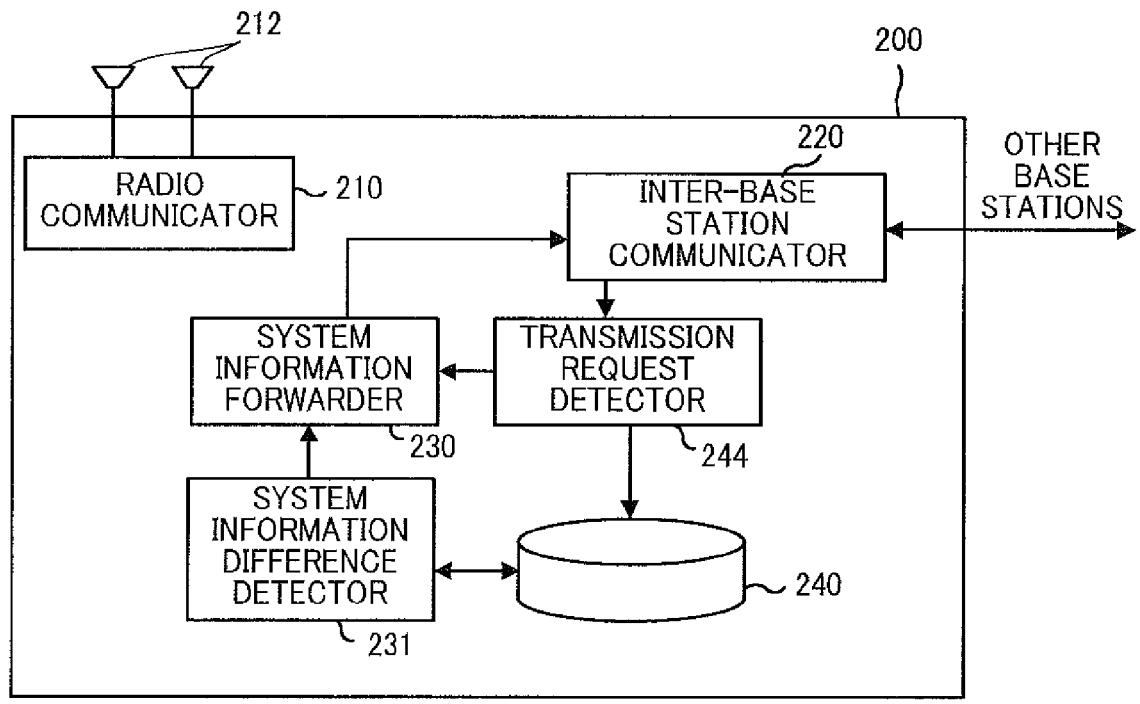
FIG. 23 is a block diagram showing a small base station according to a fifth embodiment of the present invention.

As shown in FIG. 23, the small base station 200 according to the fifth embodiment of the present invention includes a transmission request detector 244. The transmission request detector 244 is a functional block accomplished by the fact that a CPU (not shown) in the small base station 200 executes a computer program stored in a memory (not shown) and operates in accordance with the computer program. The transmission request detector 244 detects a system information transmission request by which a neighboring macro base station 100 requests transmission of the system information. Upon detecting the system information transmission request, the transmission request detector 244 stores in the memory 240 the macro base station 100 that is the transmission source of the system information transmission request.

Figure 24:
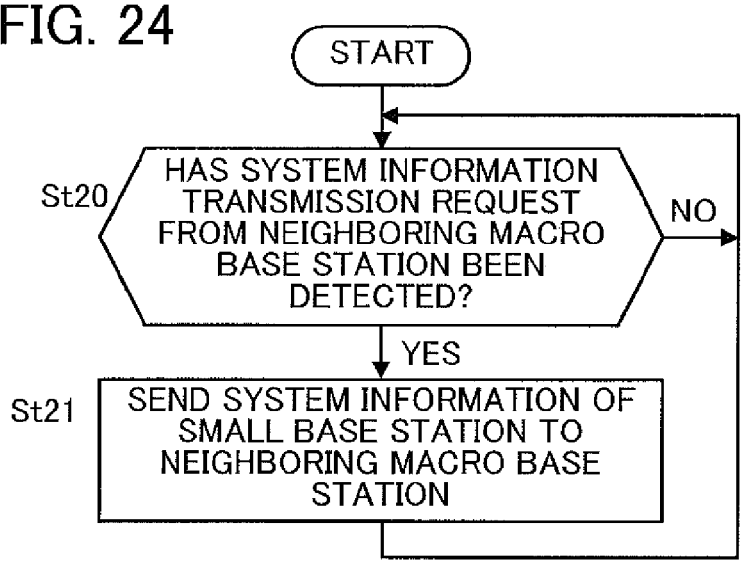
FIG. 24 is a flowchart showing an operation of the small base station shown in FIG. 23.

As shown in FIG. 24, in an operation of the small base station 200, if the transmission request detector 244 detects the system information transmission request (step St20), the system information forwarder 230 transmits the system information of the small base station 200 to the neighboring macro base station 100 that is the transmission source of the system information transmission request (step St21). In the fifth embodiment, only when a neighboring macro base station 100 requests transmission of the system information, the small base station 200, which does not broadcast the system information, forwards the system information of the small base station 200 to the neighboring macro base station 100, so that traffic can be minimized.

Figure 24A:
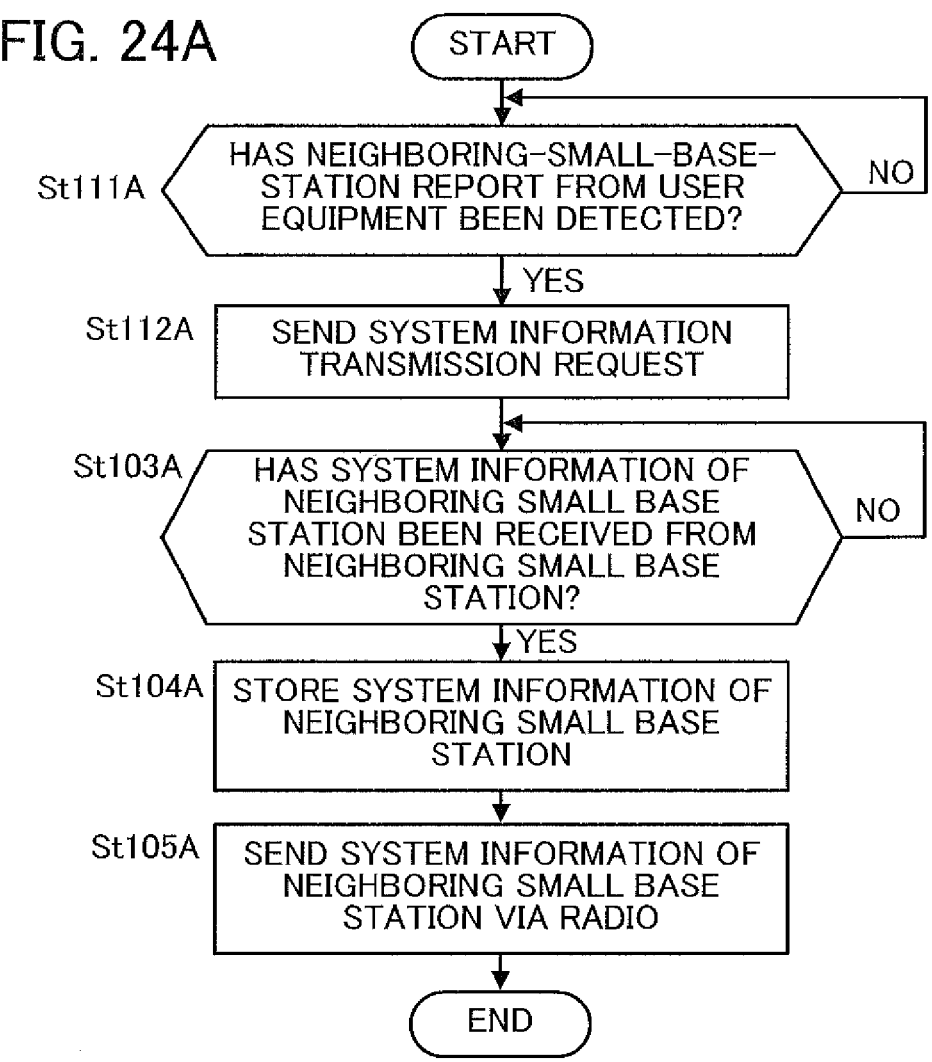
FIG. 24A is a flowchart showing an operation of the macro base station according to the fifth embodiment of the present invention.

The macro base station 100 may be the same as the macro base station 100 in the third embodiment shown in FIG. 14. As shown in FIG. 24A, in an operation of the macro base station 100, if the user request detector 138 detects a neighboring-small-base-station report from a user equipment 300 (the above-mentioned request for system information of the small base station 200 from a user equipment 300) (step St111A), the user request detector 138 sends the system information transmission request (step St112A).

Upon receiving the system information of a neighboring small base station 200 from the neighboring small base station 200 at the neighboring-base-station system information receiver 134 (step St103A), the neighboring-base-station system information receiver 134 stores the system information in the memory 140 in such a manner that the system information is associated with the small base station 200 (step St104A), and the neighboring-base-station system information transmitter 130 transmits the system information of the small base station 200 via radio for user equipments 300 located within the cell of the macro base station 100 (step St105A).

Figure 25:
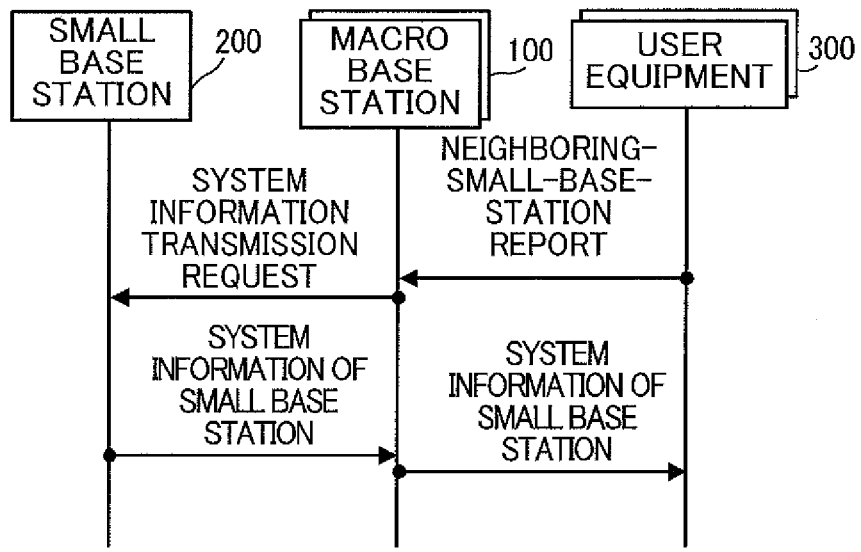
FIG. 25 is an information flow diagram showing operations in a radio communication system of the fifth embodiment.

As shown in FIG. 25, in operations of the radio communication system in the fifth embodiment, when a user equipment 300 sends a neighboring-small-base-station report (the above-mentioned request for system information of the small base station 200 from a user equipment 300), the macro base station 100 sends a system information transmission request. Upon receiving the system information transmission request, the small base station 200 returns the system information of the small base station 200 to the macro base station 100. Upon receiving the system information of the small base station 200, the macro base station 100 transmits the system information of the small base station 200 to the user equipment 300 that is the transmission source of the neighboring-small-base-station report. The neighboring-base-station system information transmitter 130 of the macro base station 100 may send the system information of the small base station 200 via radio, for example, with the use of the broadcast channel. However, preferably, in accordance with the request of system information of the small base station 200 from a user equipment 300, the neighboring-base-station system information transmitter 130 may individually send the system information of the small base station 200 to only the user equipment 300 having sent the request, for example, with the use of the dedicated channel for the user equipment 300.

In the fifth embodiment, as in a manner similar to the third embodiment, the small base station 200 decides the neighboring macro base station 100 to which the system information of the small base station 200 should be transmitted, in accordance with the notification from the neighboring macro base station 100. However, as in a manner similar to the first embodiment or the second embodiment, the small base station 200 may decide the neighboring macro base stations 100 found by the small base station 200 itself or the neighboring macro base stations 100 transmitted by the higher node, as the neighboring macro base stations 100 to which the system information of the small base station 200 should be transmitted. In addition, upon receiving a system information transmission request from one of the macro base stations 100, the system information forwarder 230 of the small base station 200 may transmit the system information of the small base station 200 to the macro base station 100.

Sixth Embodiment

Figure 26:
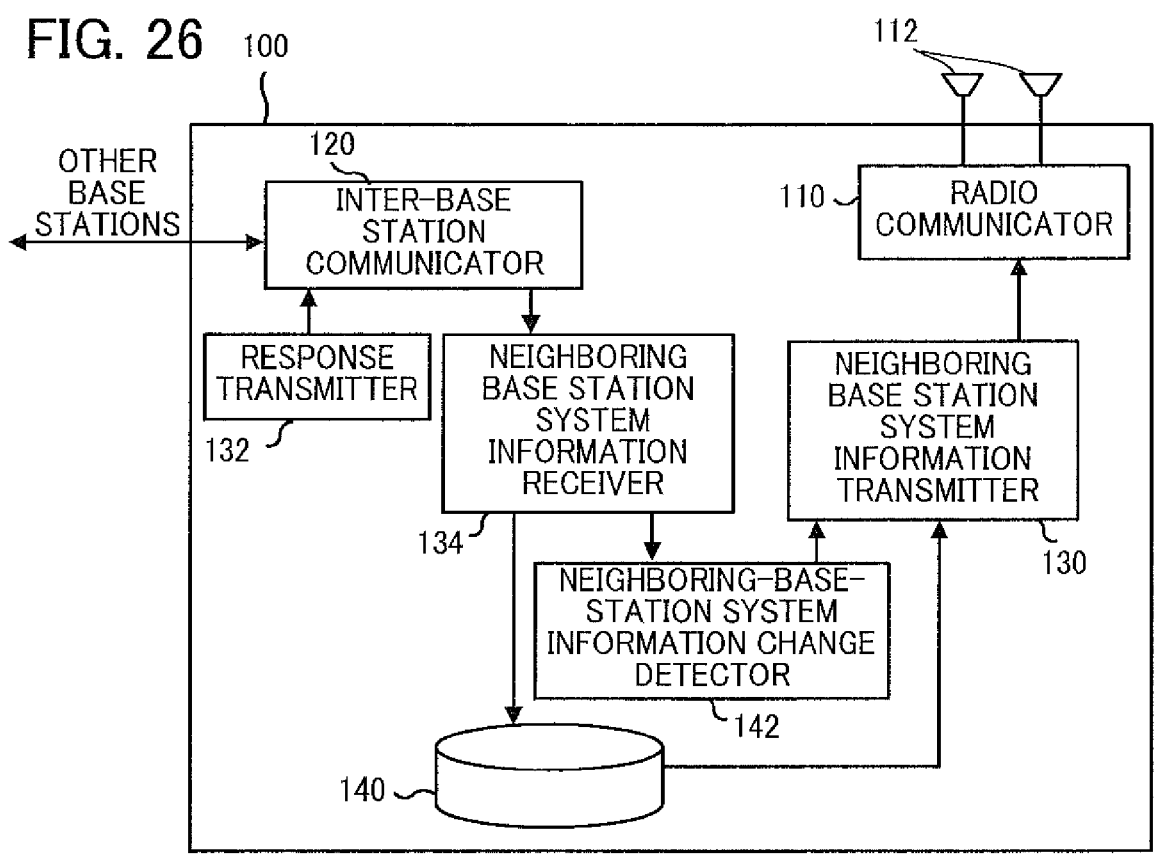
FIG. 26 is a block diagram showing a macro base station according to a sixth embodiment of the present invention.

The sixth embodiment is a modification of the macro base station 100. As shown in FIG. 26, the macro base station 100 according to the sixth embodiment of the present invention includes a neighboring-base-station system information change detector 142. The neighboring-base-station system information change detector 142 is a functional block accomplished by the fact that a CPU (not shown) in the macro base station 100 executes a computer program stored in a memory (not shown) and operates in accordance with the computer program. The neighboring-base-station system information change detector 142 detects change in the neighboring-base-station system information (system information of the small base station 200) transmitted from a neighboring small base station 200 and received by the neighboring-base-station system information receiver 134. Upon detecting change in neighboring-base-station system information by the neighboring-base-station system information change detector 142, the neighboring-base-station system information transmitter 130 transmits the neighboring-base-station system information to user equipments 300. Accordingly, the updated latest neighboring-base-station system information of a radio base station that does not broadcast system information can be received by user equipments 300.

Figure 27:
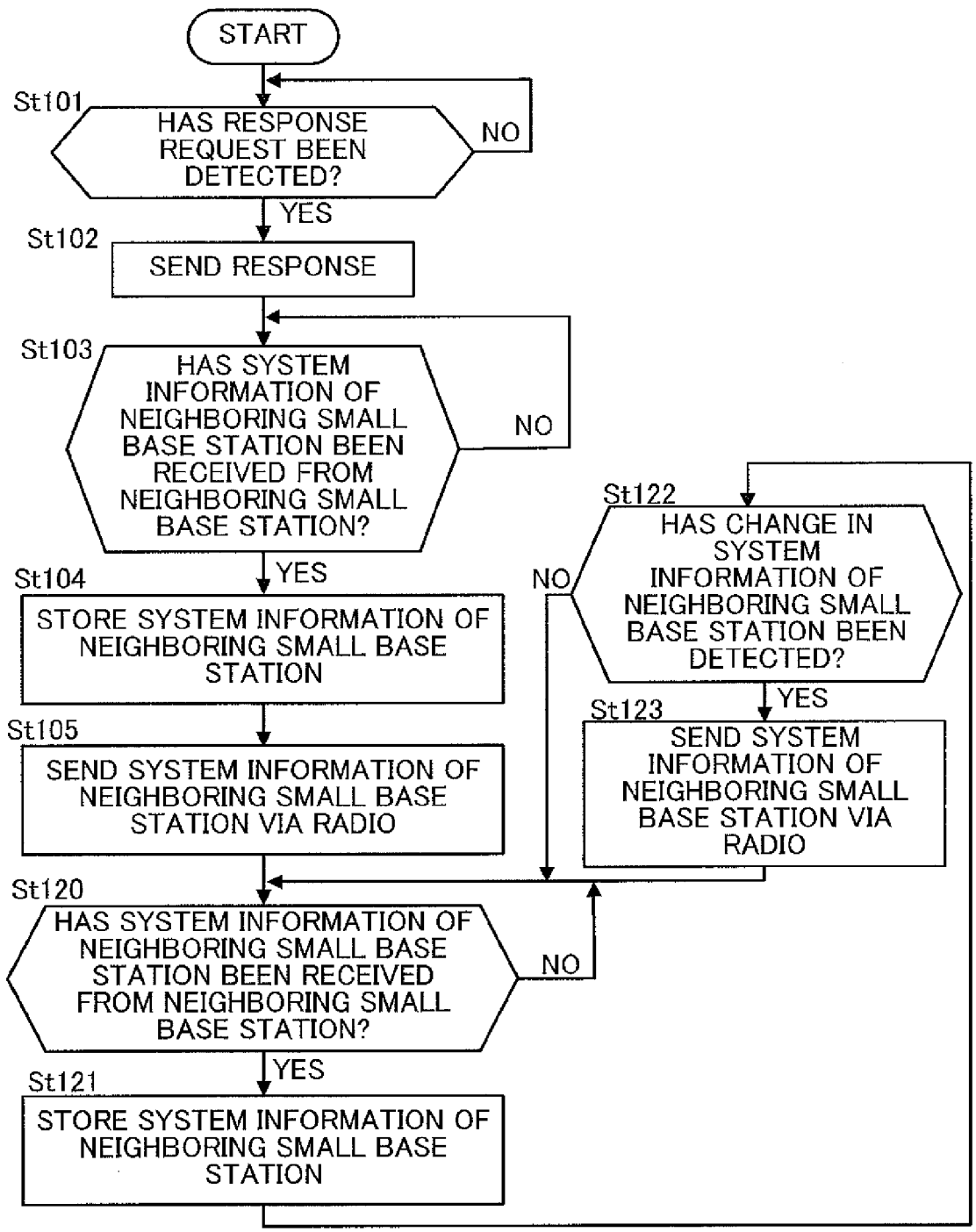
FIG. 27 is a flowchart showing an operation of the macro base station shown in FIG. 26.

FIG. 27 is a flowchart showing an operation of the macro base station 100 of the sixth embodiment. This flowchart is premised on the small base station 200 being the small base station 200 of the first embodiment, and steps St101 to St105 may be the same as those in the flowchart of FIG. 6 (the first embodiment). Aster step St105, if the neighboring-base-station system information receiver 134 receives the system information of the small base station 200 from the neighboring small base station 200 (step St120), the neighboring-base-station system information receiver 134 stores the system information of the small base station 200 in the memory 140 (step St121). Next, the neighboring-base-station system information change detector 142 decides whether or not the system information of the small base station 200 has been changed (step St122). If the decision at step St122 is affirmative, the neighboring-base-station system information transmitter 130 transmits the neighboring-base-station system information to user equipments 300 via radio. If the decision at step St122 is negative, the operation returns to step St120.

Figure 28:
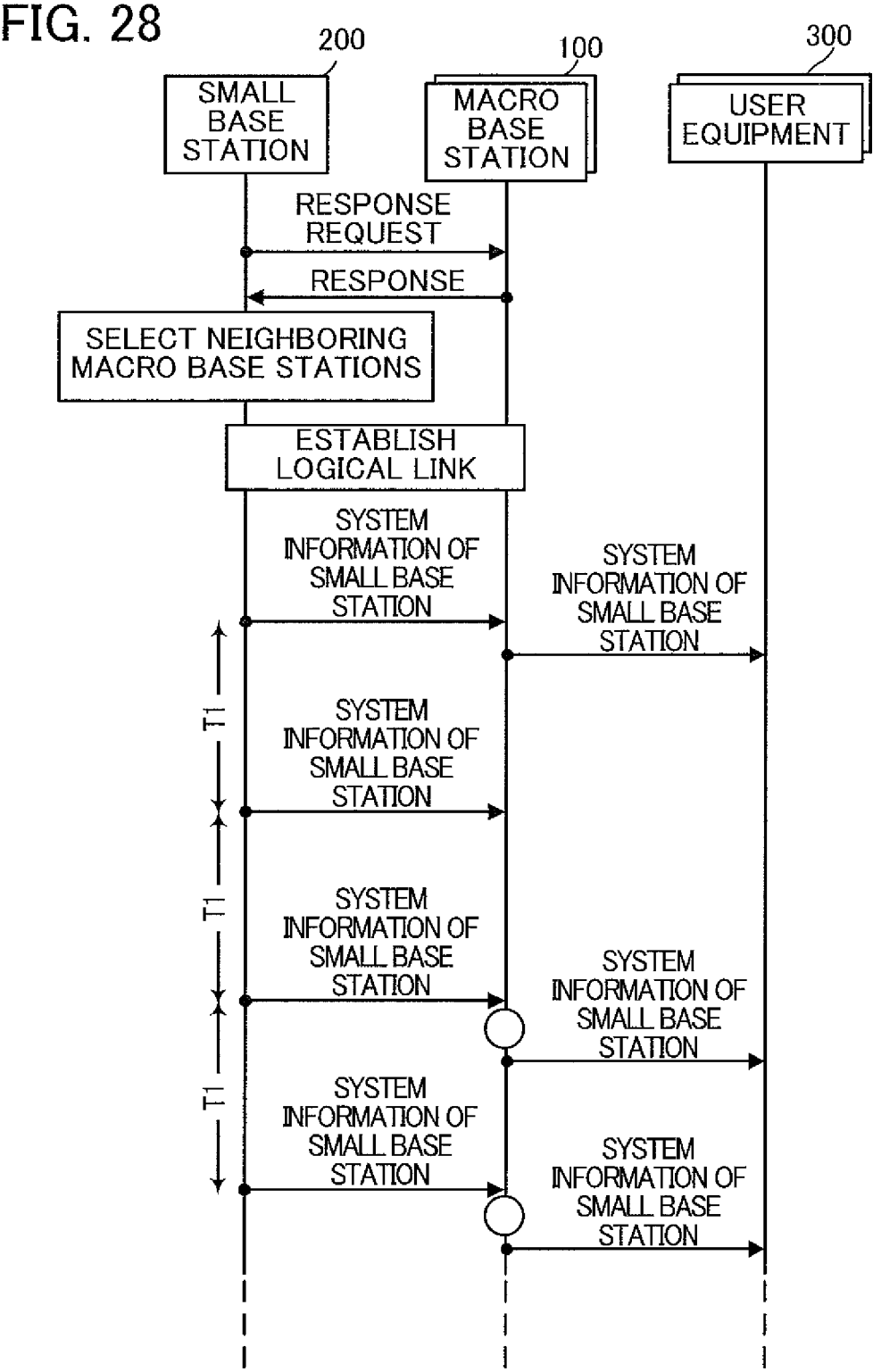
FIG. 28 is an information flow diagram showing operations in a radio communication system of the sixth embodiment.

FIG. 28 is an information flow diagram showing operations in a radio communication system of the sixth embodiment. This information flow diagram is premised on the small base station 200 being the small base station 200 of the first embodiment. The difference in the information flow diagram of FIG. 7 (the first embodiment) is that the macro base station 100 transmits the system information of the small base station 200 only when the system information of the small base station 200 has been changed after the initial wireless transmission of the system information of the small base station 200 from the macro base station 100.

In a manner similar to the first embodiment, the neighboring-base-station system information transmitter 130 of the macro base station 100 may send the system information of the small base station 200 via radio, for example, with the use of the broadcast channel. Alternatively, in accordance with the request of system information of the small base station 200 (the small-base-station report) from a user equipment 300, the neighboring-base-station system information transmitter 130 may individually send the system information of the small base station 200 to only the user equipment 300 having sent the request (the small-base-station report), for example, with the use of the dedicated channel for the user equipment 300.

Figure 29:
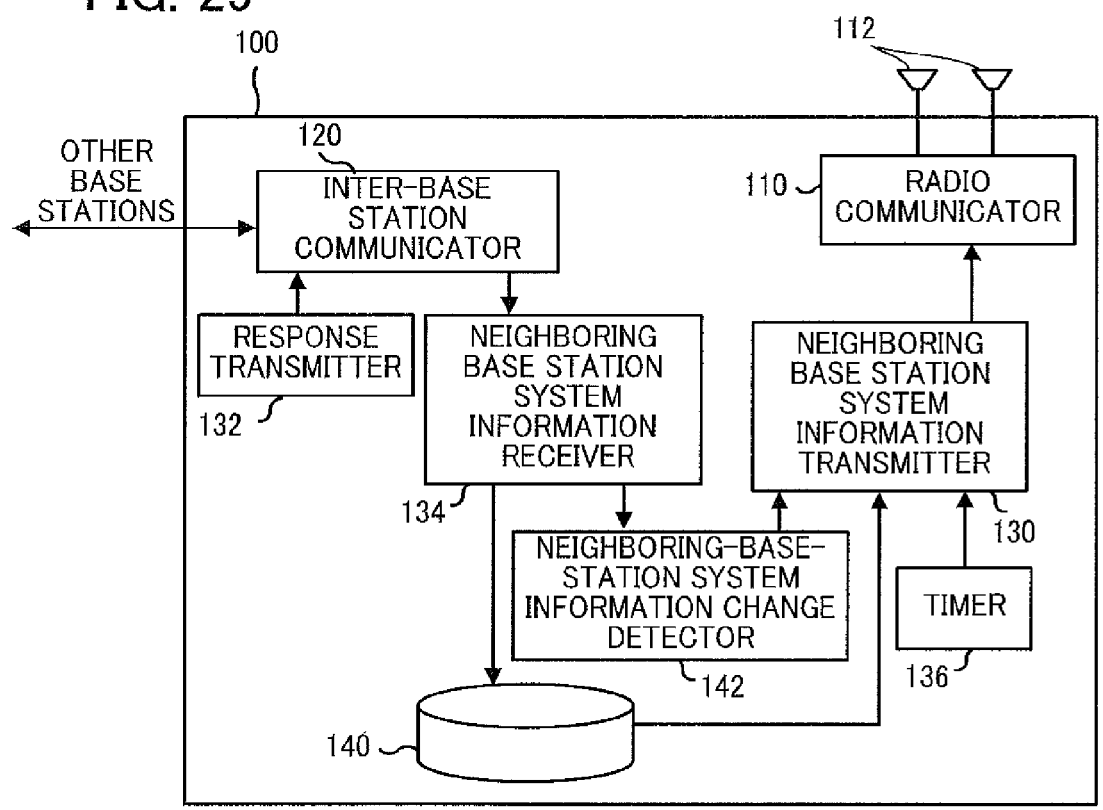
FIG. 29 is a block diagram showing a macro base station of a modification of the sixth embodiment of the present invention.

The macro base station 100 of the sixth embodiment may be modified as in the following. FIG. 29 is a block diagram showing a macro base station 100 of a modification of the sixth embodiment of the present invention. As shown in FIG. 29, the macro base station 100 includes a timer 136 in addition to the neighboring-base-station system information change detector 142.

Figure 30:
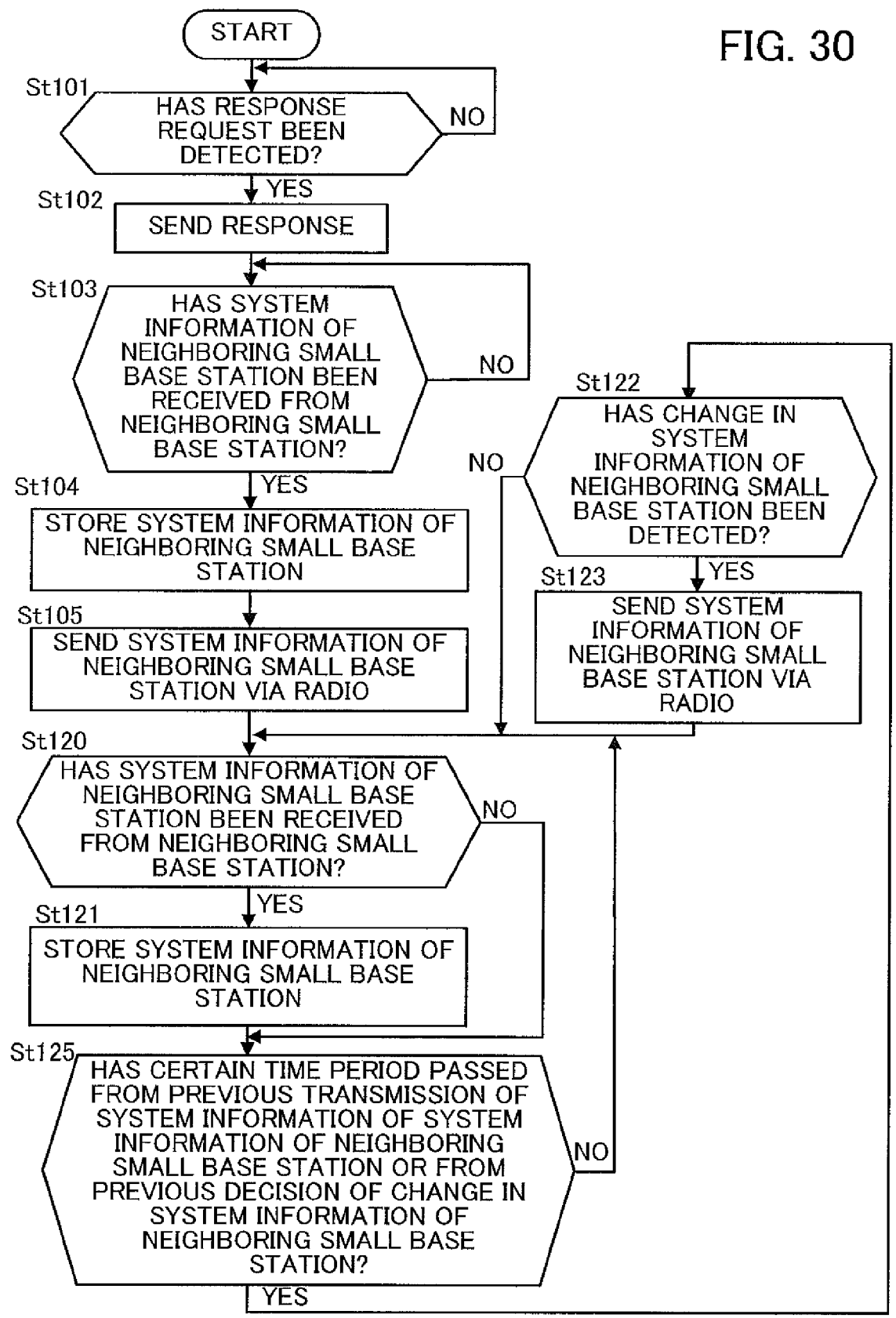
FIG. 30 is a flowchart showing an operation of the macro base station shown in FIG. 29.

FIG. 30 is a flowchart showing an operation of the macro base station shown in FIG. 29. Steps St101 to St105 may be the same as those in the flowchart of FIG. 6 (the first embodiment) or FIG. 27. After step St105, if the neighboring-base-station system information receiver 134 receives the system information of the small base station 200 from the neighboring small base station 200 (step St120), the neighboring-base-station system information receiver 134 stores the system information of the small base station 200 in the memory 140 (step St121). Next, referring to the elapsed time counted by the timer 136, if the neighboring-base-station system information transmitter 130 decides that a certain time period has passed from the previous transmission of system information of the neighboring small base station 200 or from a previous decision of change in system information of the neighboring small base station 200 (step St125), the neighboring-base-station system information change detector 142 decides whether or not the system information of the small base station 200 has been changed (step St122). If the decision at step St122 is affirmative, the neighboring-base-station system information transmitter 130 sends the system information of the small base station 200 to user equipments 300 via radio (step St123). If the decision at step St122 is negative, the operation returns to step St120, and afterward, at step St125, the neighboring-base-station system information change detector 142 decides whether or not the certain time period has passed from the previous transmission of system information of the neighboring small base station 200 (step St123) or from the previous decision of change in system information of the neighboring small base station 200 (last step St125). Thus, by deciding periodically whether the system information of the small base station 200 has been changed, and by transmitting the system information only when the system information has been changed, traffic can be reduced.

As described above, the small base station 200 of the sixth embodiment and the modification of the sixth embodiment is the same as the small base station 200 of the first embodiment. However, the small base station 200 of the sixth embodiment may be the small base station 200 of the second embodiment, the third embodiment, the fourth embodiment, or the modification of the fourth embodiment. In those cases, the macro base station 100 does not need to include the response transmitter 132.

Seventh Embodiment

Figure 31:
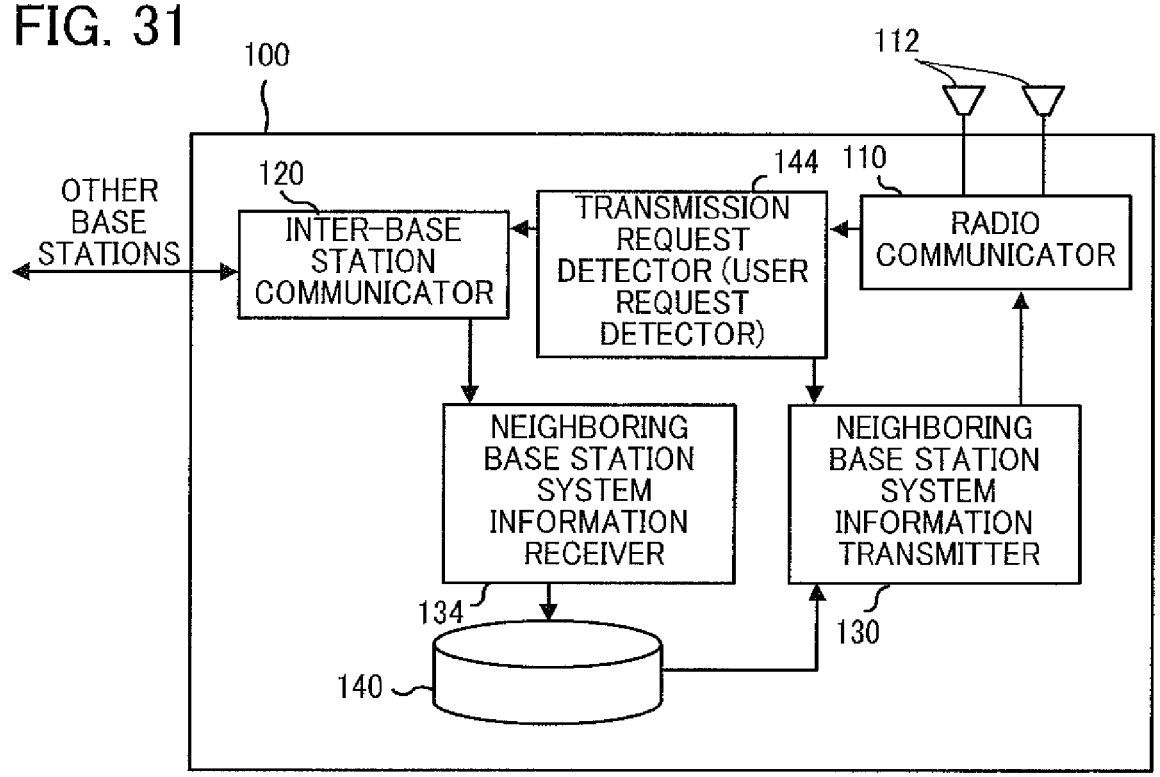
FIG. 31 is a block diagram showing a macro base station according to a seventh embodiment of the present invention.

The seventh embodiment is a modification of the macro base station 100. As shown in FIG. 31, the macro base station 100 according to the seventh embodiment of the present invention macro base station 100 includes a transmission request detector (user request detector) 144. The transmission request detector 144 is a functional block accomplished by the fact that a CPU (not shown) in the macro base station 100 executes a computer program stored in a memory (not shown) and operates in accordance with the computer program.

The transmission request detector 144 detects a neighboring-base-station system information transmission request by which a user equipment 300 requests transmission of the system information of the neighboring small base station 200. The neighboring-base-station system information transmission request may be a request for system information of the small base station 200 from a user equipment 300 that has discovered a small base station 200, which does not broadcast system information, and will connect with the small base station 200. Accordingly, the transmission request detector 144 may be the same as the user request detector 138 in the third embodiment (FIG. 14). In a case in which the transmission request detector 144 has detected a neighboring-base-station system information transmission request, the neighboring-base-station system information transmitter 130 sends the system information of the neighboring small base station 200 to the user equipment 300. In this case, by transmitting the neighboring-base-station system information to the user equipment 300 on demand from the user equipment 300, traffic can be minimized.

Figure 32:
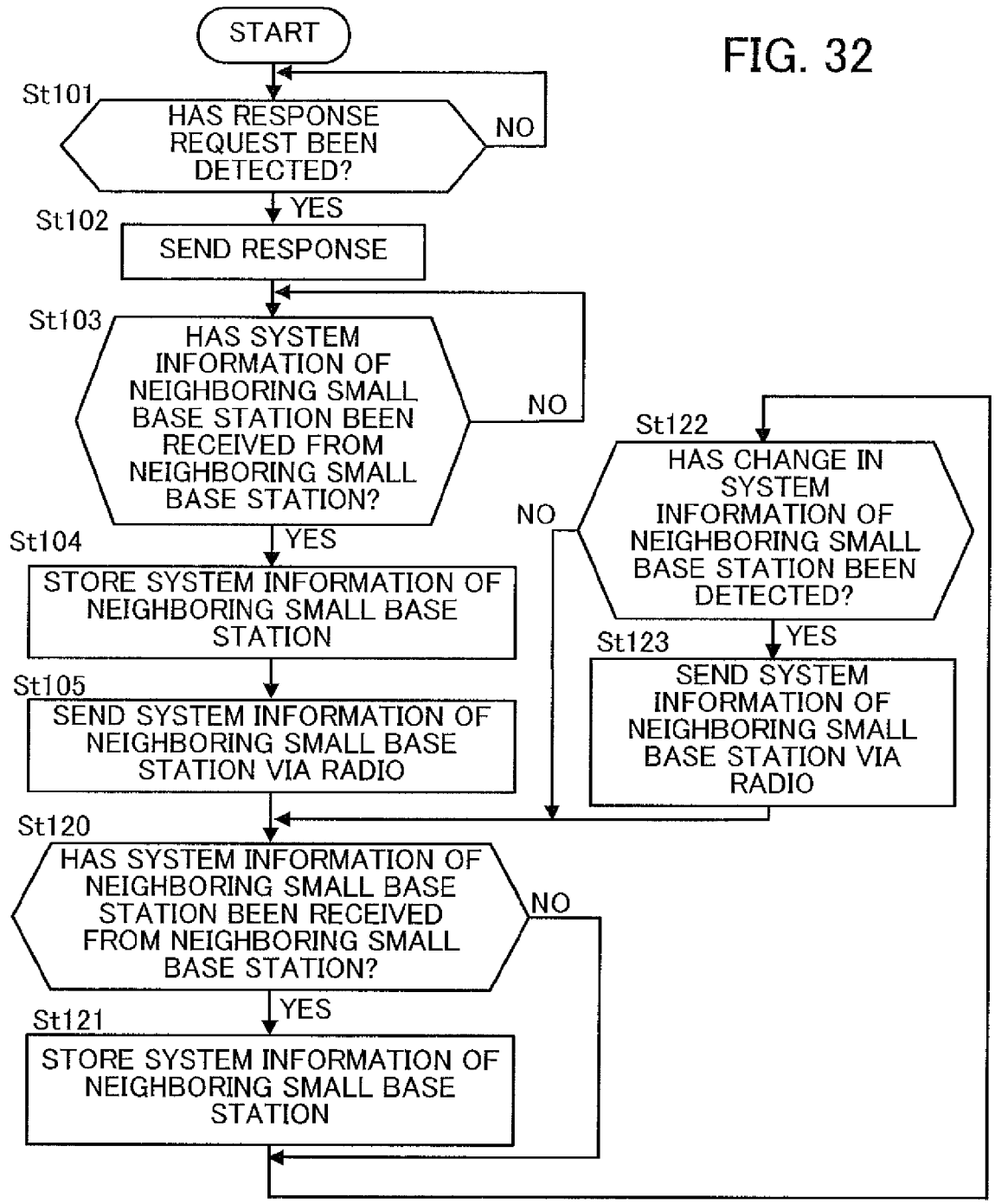
FIG. 32 is a flowchart showing an operation of the macro base station shown in FIG. 31.

FIG. 32 is a flowchart showing an operation of the macro base station 100 of the seventh embodiment. This flowchart is premised on the small base station 200 being the small base station 200 of the first embodiment, and steps St101 to St105 may be the same as those in the flowchart of FIG. 6 (the first embodiment). After step St105, if the neighboring-base-station system information receiver 134 receives the system information of the small base station 200 from the neighboring small base station 200 (step St120), the neighboring-base-station system information receiver 134 stores the system information of the small base station 200 in the memory 140 (step St121). Next, the transmission request detector 144 decides whether or not a neighboring-base-station system information transmission request has been received from a user equipment 300 (step St130). If the decision at step St130 is affirmative, the neighboring-base-station system information transmitter 130 transmits the neighboring-base-station system information to user equipments 300 via radio. If the decision at step St130 is negative, the operation returns to step St120.

Figure 33:
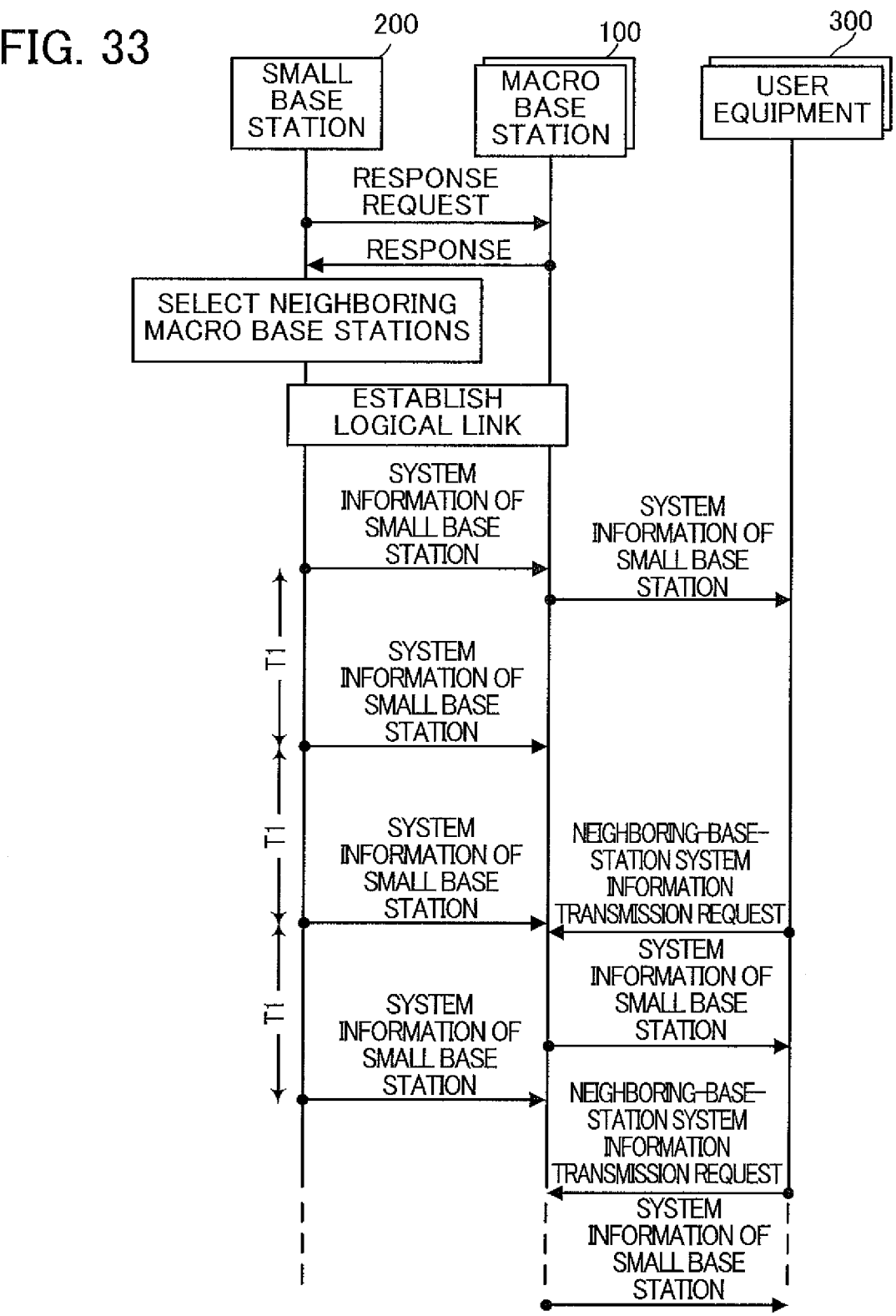
FIG. 33 is an information flow diagram showing operations in a radio communication system of the seventh embodiment.

FIG. 33 is an information flow diagram showing operations in a radio communication system of the seventh embodiment. This information flow diagram is premised on the small base station 200 being the small base station 200 of the first embodiment. The difference to the information flow diagram of FIG. 7 (the first embodiment) is that the macro base station 100 transmits the system information of the small base station 200 only when a neighboring-base-station system information transmission request has been received from a user equipment 300 after the initial wireless transmission of the system information of the small base station 200 from the macro base station 100.

In a manner similar to the first embodiment, the neighboring-base-station system information transmitter 130 of the macro base station 100 may send the system information of the small base station 200 via radio, for example, with the use of the broadcast channel. However, preferably, in accordance with the request of system information of the small base station 200 from a user equipment 300, the neighboring-base-station system information transmitter 130 may individually send the system information of the small base station 200 to only the user equipment 300 having sent the request, for example, with the use of the dedicated channel for the user equipment 300.

As described above, the small base station 200 of the seventh embodiment is the same as the small base station 200 of the first embodiment. However, the small base station 200 of the seventh embodiment may be the small base station 200 of the second embodiment, the third embodiment, the fourth embodiment, or the modification of the fourth embodiment. In those cases, the macro base station 100 does not need to include the response transmitter 132.

Eighth Embodiment

The eighth to tenth embodiments are related to a small base station 200 that transmits the system information of the small base station 200 to user equipments 300 that have already connected with the small base station 200, with the use of dedicated channels dedicated for user equipments 300. The small base station 200 according to any one of the eighth to tenth embodiments has the same structure as that of the small base station 200 in the first embodiment, the second embodiment, the third embodiment, the fourth embodiment, the modification of the fourth embodiment, or the fifth embodiment, and further has features that will be described later. As in FIG. 34, FIG. 37, FIG. 41, and FIG. 42 showing the small base station 200 according to the eighth to tenth embodiments, the small base station 200 includes a response request transmitter 232 and a neighboring base station detector 234 in a manner similar to the first embodiment. However, if the small base station 200 does not detect neighboring macro base stations 100 on the basis of the response request as in the first embodiment, the response request transmitter 232 and the neighboring base station detector 234 are unnecessary.

Figure 34:
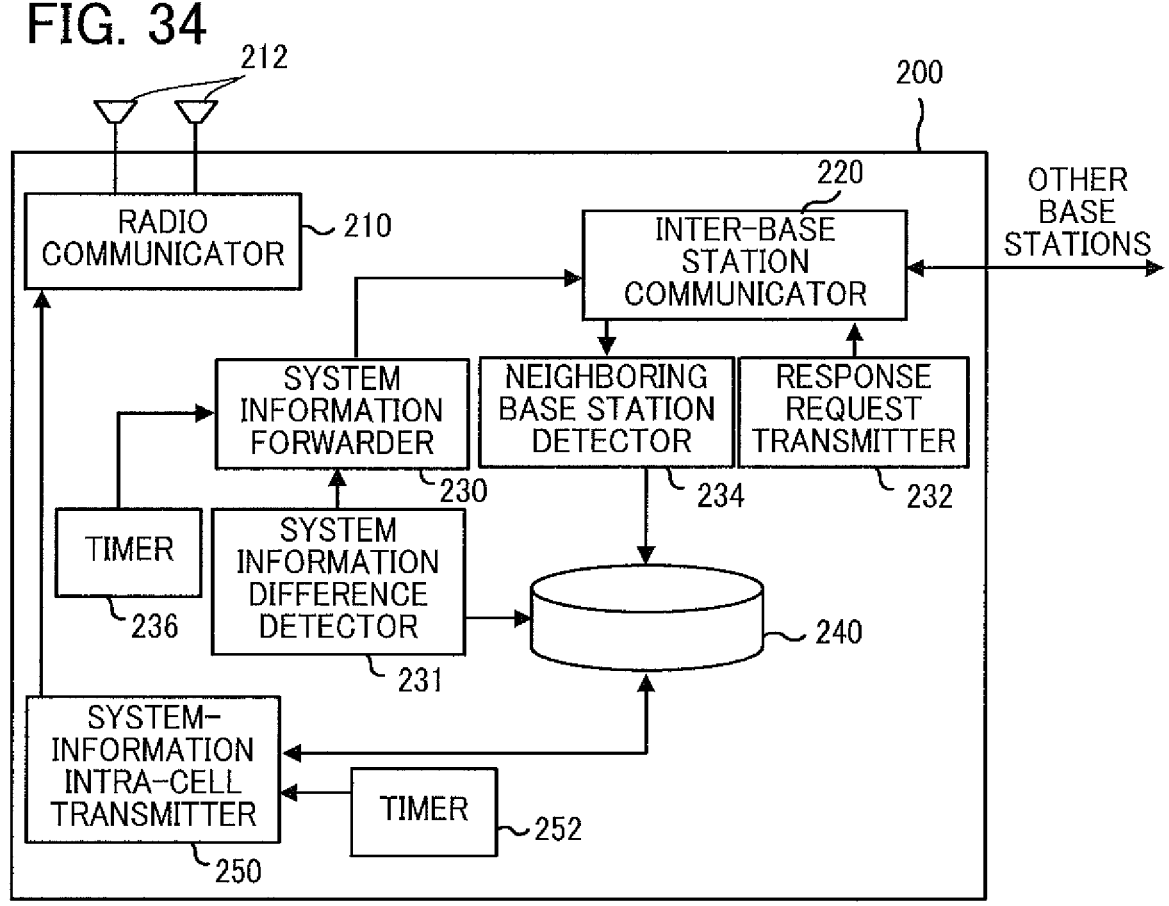
FIG. 34 is a block diagram showing a small base station according to an eighth embodiment of the present invention.

As shown in FIG. 34, the small base station 200 according to the eighth embodiment of the present invention includes an system-information intra-cell transmitter 250 and a timer 252. The system-information intra-cell transmitter 250 and the timer 252 are functional blocks accomplished by the fact that a CPU (not shown) in the small base station 200 executes a computer program stored in a memory (not shown) and operates in accordance with the computer program.

After connection of a user equipment 300 with the small base station 200, the system-information intra-cell transmitter 250 transmits post-connection system information to the user equipment 300 through the radio communicator 210 using the dedicated channel dedicated for the user equipment, the post-connection system information including at least any of information on restriction of connection with the small base station 200, information necessary for re-connection with the small base station 200, information on macro base stations 100, and advance warning announcement of earthquakes or tsunamis. After connection with the small base station 200, the user equipment 300 can receive such pieces of the system information from the small base station 200.

Referring to the elapsed time counted by the timer 252, the system-information intra-cell transmitter 250 sends the system information periodically to the user equipment 300. The system information may be changed, but by transmitting the system information periodically to the user equipment 300, the user equipment 300 can receive the updated latest system information of the small base station 200, which does not broadcast the system information.

Figure 35:
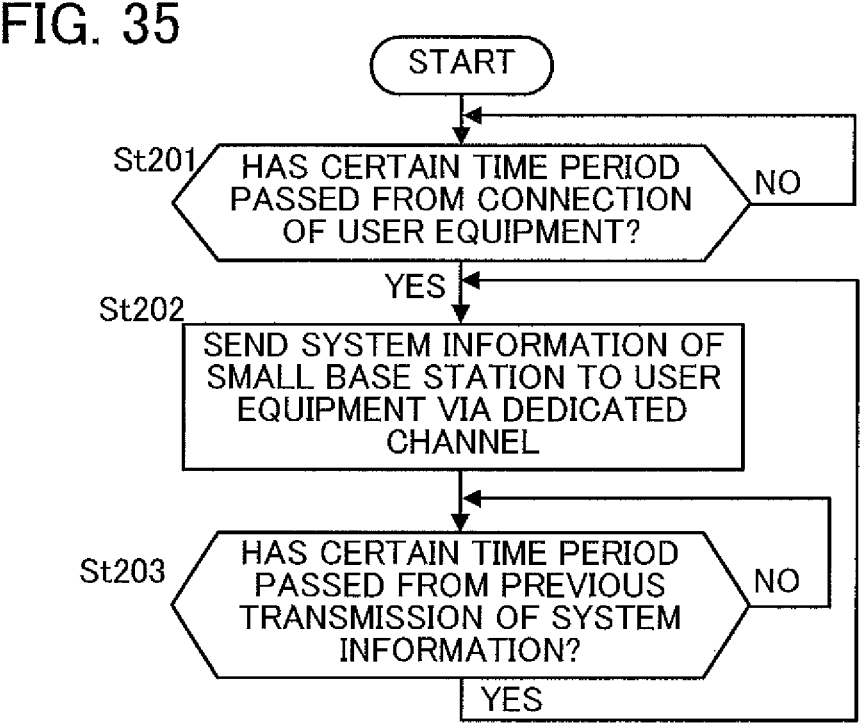
FIG. 35 is a flowchart showing an operation of the small base station shown in FIG. 34.

As shown in FIG. 35, in an operation of the small base station 20, after a certain time period has passed from the connection of the user equipment 300 (step St201), the system-information intra-cell transmitter 250 sends the system information of the small base station 200 to the user equipment 300 via the dedicated channel (step St202). Furthermore, after a certain time period has passed from the previous transmission of the system information of the small base station 200 (step St203), the system-information intra-cell transmitter 250 sends the system information of the small base station 200 to the user equipment 300 via the dedicated channel (step St202). Until the user equipment 300 leaves the small base station 200 and is connected with another radio base station, steps St202 and step St203 are repeated.

Figure 36:
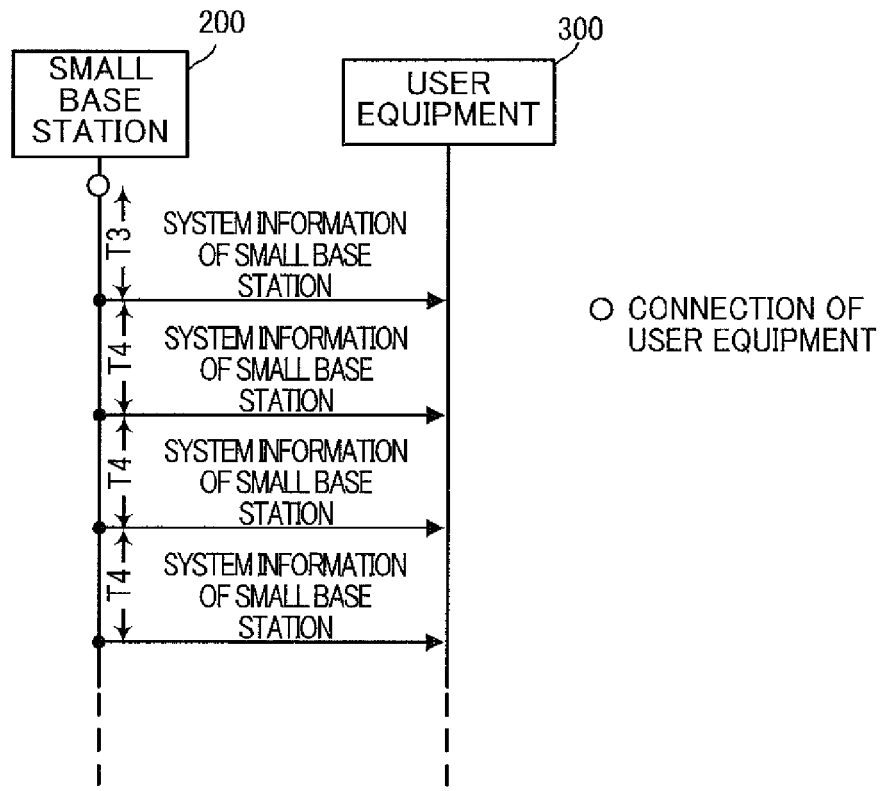
FIG. 36 is an information flow diagram showing operations in a radio communication system of the eighth embodiment.

FIG. 36 is an information flow diagram showing operations in a radio communication system of the eighth embodiment. As shown in FIG. 36, the small base station 200 sends the system information of the small base station 200 to the macro base station 100 after a certain time period T3 has passed from the connection of the user equipment 300. In addition, the small base station 200 sends the system information of the small base station 200 to the user equipment 300 at certain intervals T4.

Ninth Embodiment

Figure 37:
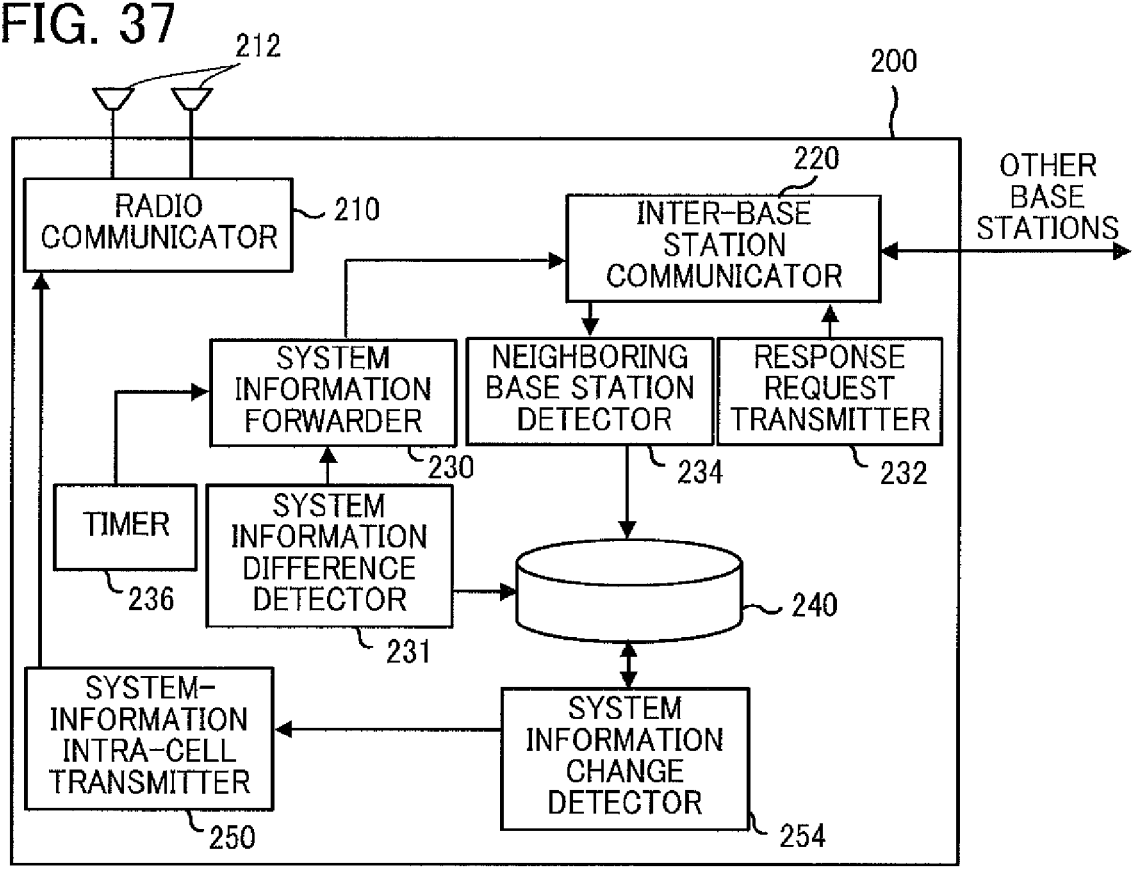
FIG. 37 is a block diagram showing a small base station according to a ninth embodiment of the present invention.

As shown in FIG. 37, the small base station 200 according to the ninth embodiment of the present invention includes a system information change detector 254 in addition to the system-information intra-cell transmitter 250. The system information change detector 254 is a functional block accomplished by the fact that a CPU (not shown) in the small base station 200 executes a computer program stored in a memory (not shown) and operates in accordance with the computer program. The system information change detector 254 detects change in the system information of the small base station 200. The system information change detector 254 has a function that is the same as that of the system information change detector 242 in the fourth embodiment (FIG. 18), but the purpose is different.

Figure 38:
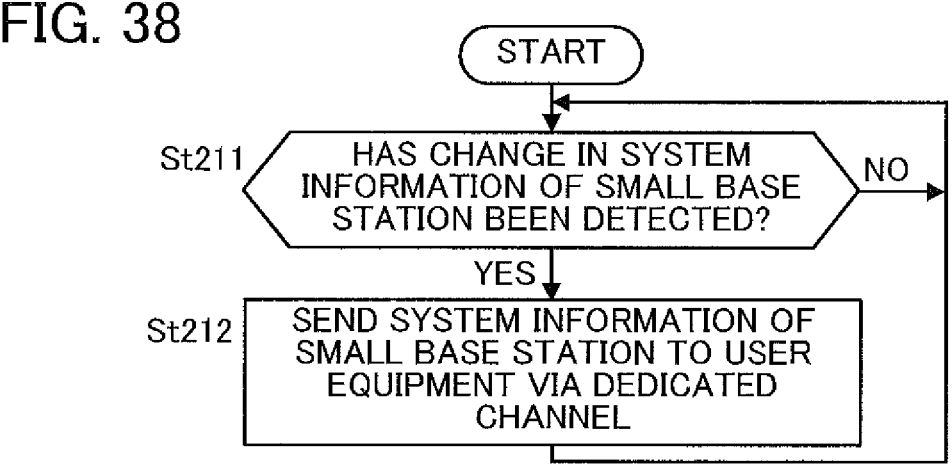
FIG. 38 is a flowchart showing an operation of the small base station shown in FIG. 37.

As shown in FIG. 38, if the system information change detector 254 detects change in the system information of the small base station 200 (step St211), the system-information intra-cell transmitter 250 sends the system information of the small base station 200 to the user equipment 300 using the dedicated channel dedicated for the user equipment 300 (step St212). Accordingly, the updated latest system information of the small base station 200, which does not broadcast the system information, can be received by the user equipment 300. Until the user equipment 300 leaves the small base station 200 and is connected with another radio base station, step St211 and step St212 are repeated.

Figure 39:
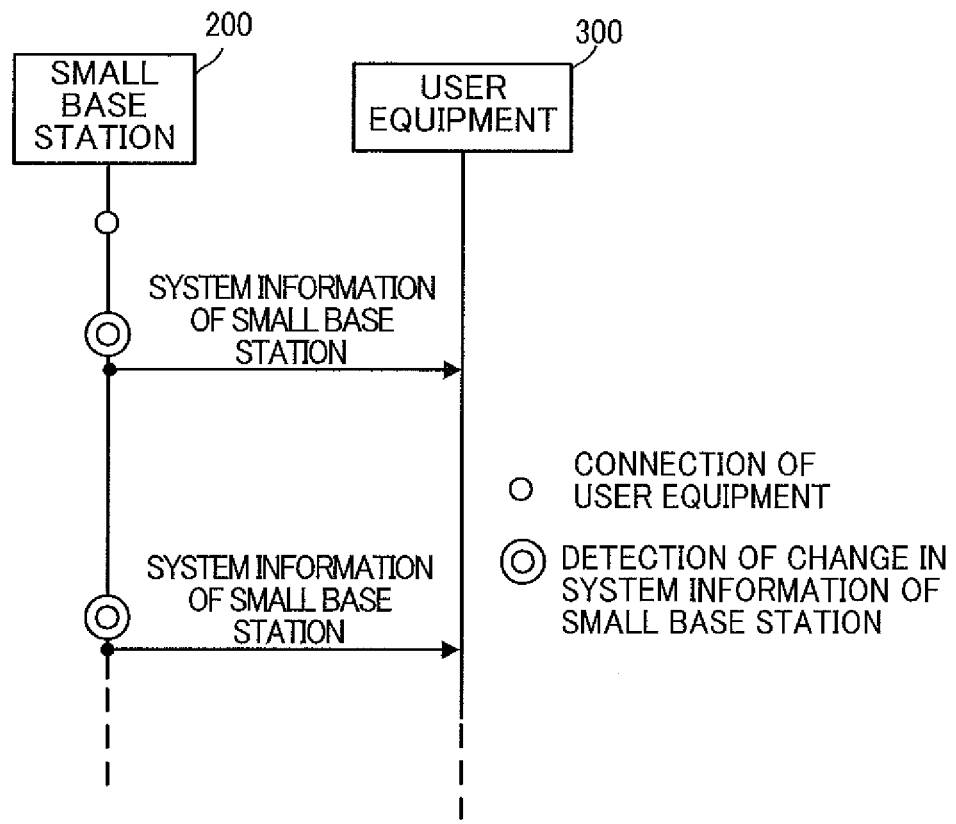
FIG. 39 is an information flow diagram showing operations in a radio communication system of the ninth embodiment.

FIG. 39 is an information flow diagram showing operations in a radio communication system of the ninth embodiment. As shown in FIG. 39, after the connection of the user equipment 300, whenever the small base station 200 detects change in the system information of the small base station 200, the small base station 200 sends the system information of the small base station 200 to the user equipment 300.

Figure 40:
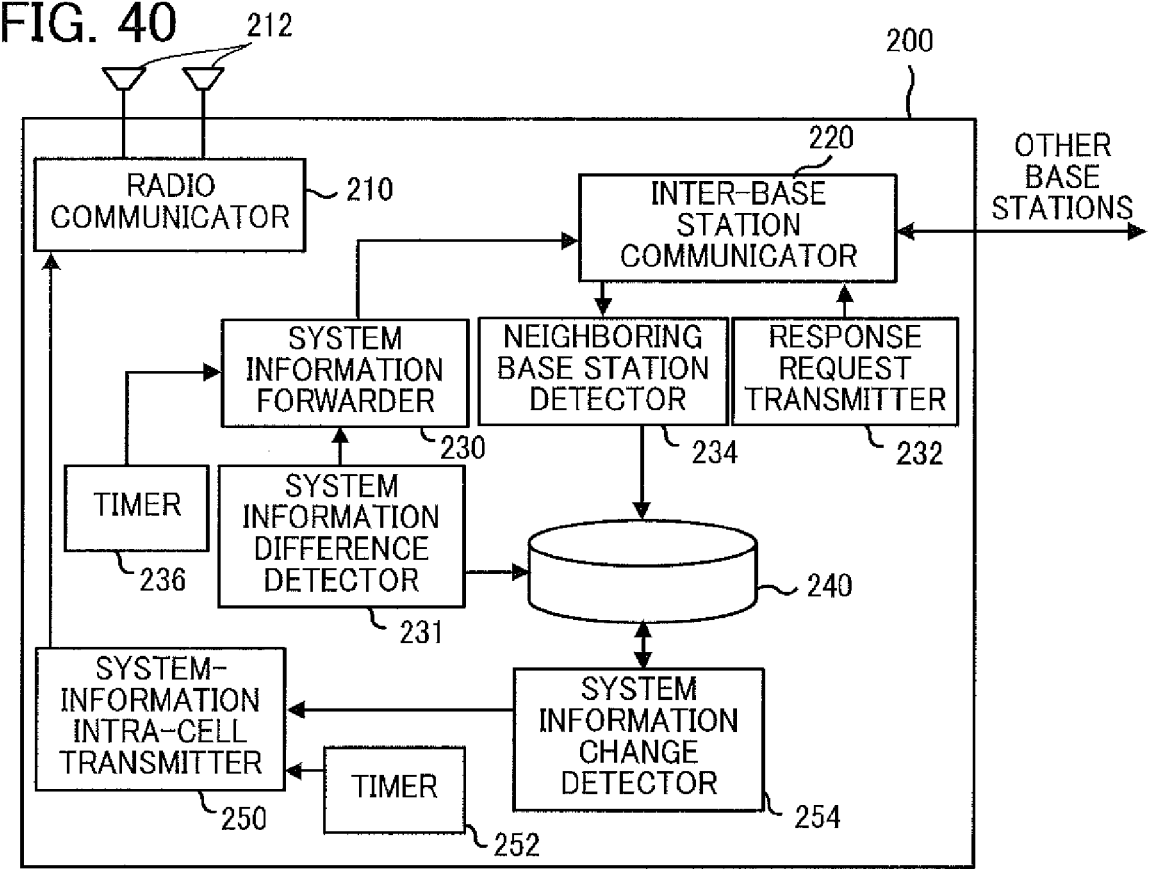
FIG. 40 is a block diagram showing a small base station according to a modification of the ninth embodiment of the present invention.

The small base station 200 of the ninth embodiment may be modified as in the following. FIG. 40 is a block diagram showing a small base station according to a modification of the ninth embodiment of the present invention. As shown in FIG. 40, the small base station 200 uses a timer 252 in addition to the system-information intra-cell transmitter 250 and the system information change detector 254.

Figure 41:
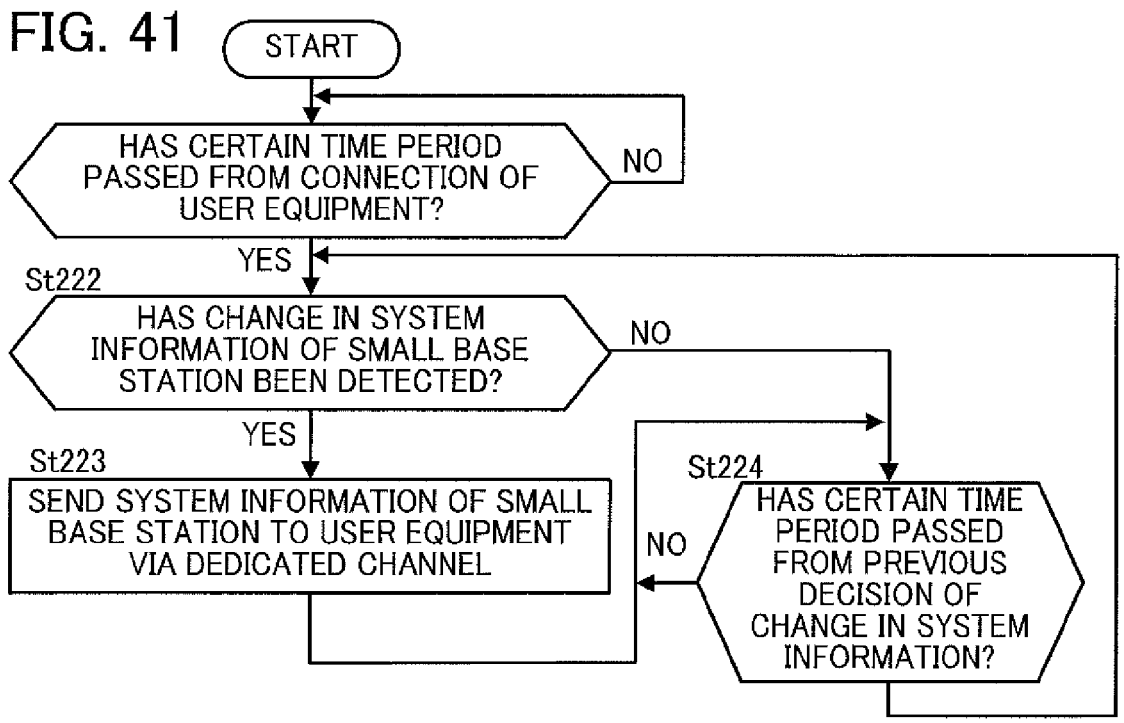
FIG. 41 is a flowchart showing an operation of the small base station shown in FIG. 40.

As shown in FIG. 41, in an operation of the small base station 20, after a certain time period has passed from the connection of the user equipment 300 (step St221), the system information change detector 254 decides whether or not the system information of the small base station 200 has been changed (step St222). If the decision at step St222 is affirmative, the system-information intra-cell transmitter 250 sends the system information of the small base station 200 to the user equipment 300 using the dedicated channel dedicated for the user equipment 300 (step St223). Then, if a certain time period has passed (step St224) from the previous decision of change in system information (step St222), the system information change detector 254 decides whether or not the certain time period has passed from the previous transmission of system information again (step St222). If the decision at step St222 is negative, the operation proceeds to step St224. Thus, by deciding periodically whether the system information of the small base station 200 has been changed, and by transmitting the system information only when the system information has been changed, traffic can be reduced. Until the user equipment 300 leaves the small base station 200 and is connected with another radio base station, step St211 and step St212 are repeated.

Tenth Embodiment

Figure 42:
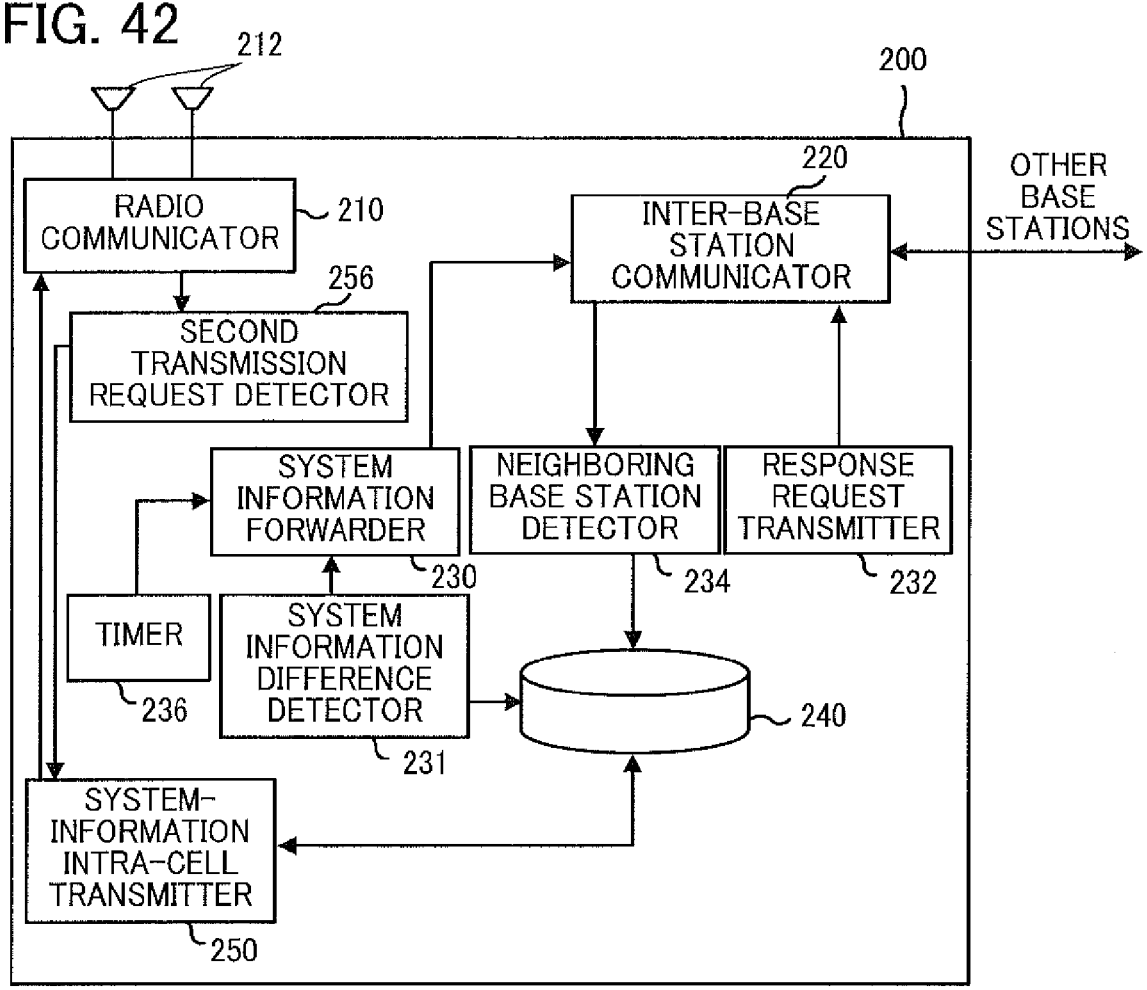
FIG. 42 is a block diagram showing a small base station according to a tenth embodiment of the present invention.

As shown in FIG. 42, the small base station 200 according to the tenth embodiment of the present invention includes a second transmission request detector 256 in addition to the system-information intra-cell transmitter 250. The second transmission request detector 256 is a functional block accomplished by the fact that a CPU (not shown) in the small base station 200 executes a computer program stored in a memory (not shown) and operates in accordance with the computer program. The second transmission request detector 256 detects a system information transmission request by which a user equipment 300 having been connected with the small base station 200 requests transmission of the system information of the small base station 200.

Figure 43:
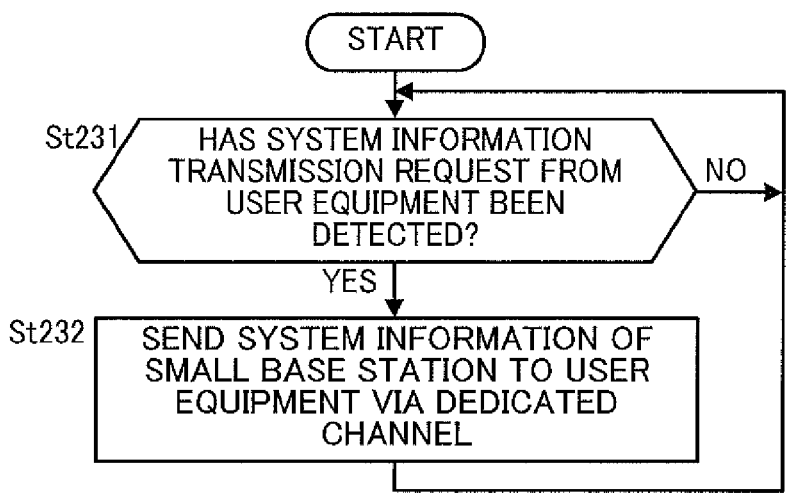
FIG. 43 is a flowchart showing an operation of the small base station shown in FIG. 43.

As shown in FIG. 43, in an operation of the small base station 200, whenever the second transmission request detector 256 detects the system information transmission request from a user equipment 300 (step St231), the system-information intra-cell transmitter 250 sends the system information of the small base station 200 to the user equipment 300 using the dedicated channel dedicated for the user equipment 300 (step St232). Accordingly, the updated latest system information of the small base station 200, which does not broadcast the system information, can be received by the user equipment 300. In addition, when a user equipment 300 makes a request for transmission of the system information, the small base station 200, which does not broadcast the system information, sends the system information to the user equipment 300, so that traffic can be minimized. Until the user equipment 300 leaves the small base station 200 and is connected with another radio base station, step St231 and step St232 are repeated.

Figure 44:
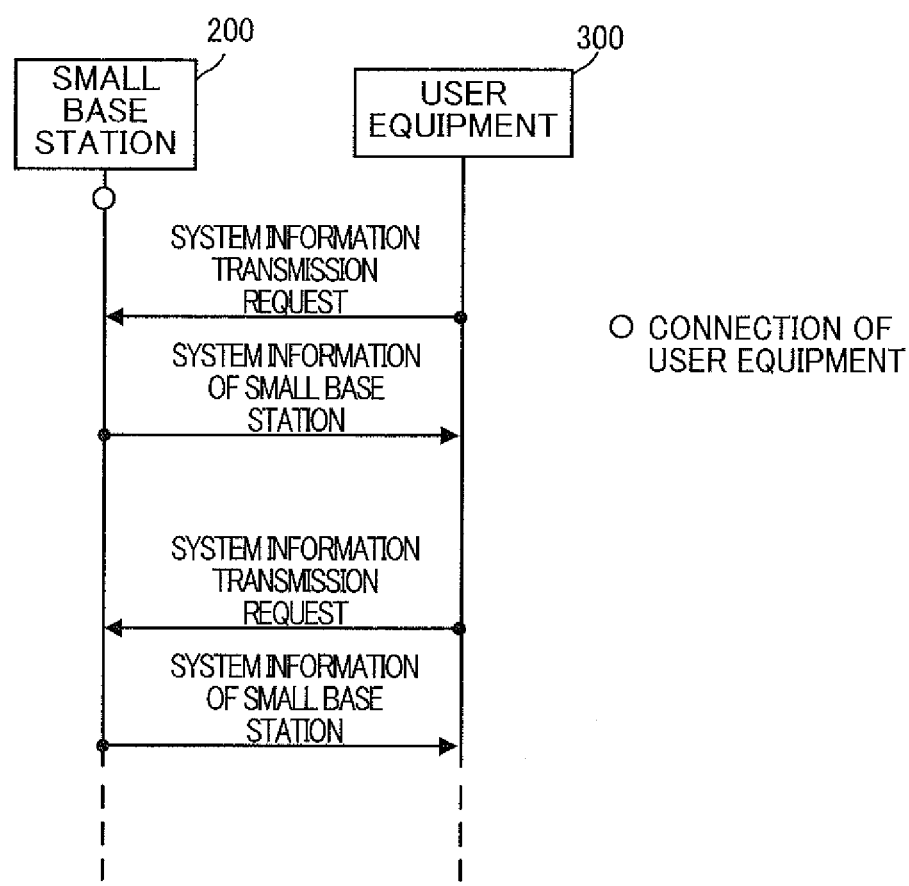
FIG. 44 is an information flow diagram showing operations in a radio communication system of the tenth embodiment.

FIG. 44 is an information flow diagram showing operations in a radio communication system of the tenth embodiment. As shown in FIG. 44, after the connection of a user equipment 300, whenever the small base station 200 receives a system information transmission request from the user equipment 300 having been connected with the small base station 200, the small base station 200 sends the system information of the small base station 200 to the user equipment 300.

Other Modifications

In some of the above-described embodiments, although the small base station 200 is provided with the system information difference detector 231, the system information difference detector 231 is unnecessary if the small base station 200 sends the entire system information of the small base station 200 rather than the changed portion (difference) of the system information.

In the above-described embodiments, the radio base station not having a function to broadcast system information to user equipments is the small base station, of which the transmission power is low. However, the present invention is not limited to transmission of the system information of a small base station. In a case in which a macro base station, of which the transmission power is high, does not have a function to broadcast its system information to user equipments, the present invention can be applied for transmission of the system information of the macro base station.

In the above-described embodiments, the system information is forwarded from the radio base station not having a function to broadcast system information to user equipments to the macro base station, which in turn transmits the system information to user equipments. However, the radio base station that relays the system information is not limited to a macro base station. An existing low-power base station (micro base station, nano base station, pico base station, or femto base station) may relay the system information. Furthermore, even the small base station may relay the system information of another radio base station since the small base station can send a signal to a user equipment having connected with the small base station by means of the dedicated channel, although small base stations do not have the broadcasting function.

In the above-described embodiments, the radio communication system complies with the LTE, the present invention can be used with other radio access technologies with necessary design modifications.

In radio base stations (macro base stations 100 and small base stations 200 in the above-described embodiments), functions executed by the CPU may be executed by hardware or a programmable logic device, such as an FPGA (Field Programmable Gate Array) or a DSP (Digital Signal Processor), instead of the CPU.

The above-described embodiments and modifications may be combined as long as there is no conflict.

REFERENCE SYMBOLS

10: MME
100: macro base station (radio base station)
110: radio communicator
112: transceiving antenna
120: inter-base station communicator
130: neighboring-base-station system information transmitter
132: response transmitter
134: neighboring-base-station system information receiver
136: timer
138: user request detector
142: neighboring-base-station system information change detector
140: memory
144: transmission request detector
144: transmission request detector (user request detector)
200: small base station
200: small base station (radio base station)
210: radio communicator
212: transceiving antenna
220: inter-base station communicator
230: system information forwarder
231: system information difference detector
232: response request transmitter
234: neighboring base station detector
236: timer
240: memory
242: system information change detector
242: system information change detector (system information difference detector)
237: higher node communicator
238: neighboring base station detector
300: user equipment
250: system-information intra-cell transmitter
252: timer
254: system information change detector
244: transmission request detector
256: the second transmission request detector
Cm: macro cell
Cs: small cell

The invention claimed is:
1. A radio base station wirelessly communicating with user equipments, the radio base station not having a function to broadcast, to the user equipments, system information including information necessary for the user equipments to connect with the radio base station, the radio base station comprising:
 a radio communicator configured to wirelessly communicate with the user equipments;
 an inter-base station communicator configured to communicate with at least one other broadcasting radio base station having a function to broadcast system information;
 a system information forwarder configured to transmit the system information through the inter-base station communicator to the broadcasting radio base station in order to assist the user equipments to connect with the radio base station not having a function to broadcast the system information;
 a response request transmitter configured to transmit a response request for requesting a response to other radio base stations through the inter-base station communicator; and
 a broadcasting base station detector configured to detect a response from a broadcasting radio base station, the response being a reply to the response request,
 wherein the system information forwarder transmits the system information to the broadcasting radio base station, which has sent the response detected by the broadcasting base station detector.

2. The radio base station according to claim 1, wherein the system information forwarder transmits the system information to the broadcasting radio base station notified by a higher node.

3. The radio base station according to claim 1, further comprising a system information change detector configured to detect change in the system information, wherein the system information forwarder transmits the system information to the broadcasting radio base station in a case in which the system information change detector has detected change in the system information.

4. The radio base station according to claim 1, further comprising a system information difference detector configured to detect a difference between old system information and new system information in a case in which the system information has been changed, wherein the system information forwarder transmits the difference detected by the system information difference detector to the broadcasting radio base station.

5. A radio base station wirelessly communicating with user equipments, comprising:
   a radio communicator configured to wirelessly communicate with the user equipments;
   a non-broadcasting-base-station system information receiver configured to receive non-broadcasting-base-station system information, which is system information including information necessary for user equipments to connect with a non-broadcasting radio base station, from the non-broadcasting radio base station not having a function to broadcast system information to user equipments;
   a non-broadcasting-base-station system information transmitter configured to transmit the non-broadcasting-base-station system information through the radio communicator to user equipments having connected with the radio base station in order to assist the user equipments to connect with the non-broadcasting radio base station; and
   a response transmitter configured to transmit a response to the non-broadcasting radio base station that is a transmission source of a response request for searching a destination of the non-broadcasting-base-station system information.

6. The radio base station according to claim 5, wherein the non-broadcasting-base-station system information transmitter periodically transmits the non-broadcasting-base-station system information to the user equipments.

7. The radio base station according to claim 5, further comprising a transmission request detector configured to detect a non-broadcasting-base-station system information transmission request by which a user equipment requests transmission of the non-broadcasting-base-station system information, wherein the non-broadcasting-base-station system information transmitter transmits the non-broadcasting-base-station system information to the user equipment in a case in which the transmission request detector has detected the non-broadcasting-base-station system information transmission request.

8. A radio communication system comprising:
   a first radio base station wirelessly communicating with user equipments, the first radio base station not having a function to broadcast, to the user equipments, system information including information necessary for the user equipments to connect with the first radio base station; and
   a second radio base station wirelessly communicating with user equipments, the second radio base station having a function to broadcast, to the user equipments, system information including information necessary for the user equipments to connect with the first radio base station,
   wherein the first radio base station comprises:
      a radio communicator configured to wirelessly communicate with the user equipments;
      an inter-base station communicator configured to communicate with at least one other radio base station; and
      a system information forwarder configured to transmit the system information through the inter-base station communicator to the second radio base station in order to assist the user equipments to connect with the first radio base station,
   wherein the second radio base station comprises:
      a radio communicator configured to wirelessly communicate with the user equipments;
      a system information receiver configured to receive the system information from the first radio base station; and
      a system information transmitter configured to transmit the system information through the radio communicator to the user equipments having connected with the second radio base station in order to assist the user equipments to connect with the first radio base station,
   wherein the first radio base station further comprises:
      a response request transmitter configured to transmit a response request for requesting a response to the second radio base station through the inter-base station communicator; and
      a broadcasting base station detector configured to detect a response from the second radio base station, the response being a reply to the response request,
   wherein the system information forwarder transmits the system information to the second radio base station, which has sent the response detected by the broadcasting base station detector, and
   wherein the second radio base station further comprises a response transmitter configured to transmit a response to the first radio base station that is a transmission source of the response request for searching a destination of the system information.

* * * * *